(12) United States Patent
Kumar et al.

(10) Patent No.: US 12,313,801 B2
(45) Date of Patent: May 27, 2025

(54) MARINE SEISMIC IMAGING

(71) Applicant: SCHLUMBERGER TECHNOLOGY CORPORATION, Sugar Land, TX (US)

(72) Inventors: Rajiv Kumar, Horley (GB); Yousif Izzeldin Kamil Amin, Crawley (GB); Sonika, Surry (GB); Massimiliano Vassallo, Brighton (GB); Nihed El Allouche, Cambridge (GB); Daniele Boiero, Kent (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 231 days.

(21) Appl. No.: 17/908,681

(22) PCT Filed: Mar. 8, 2021

(86) PCT No.: PCT/US2021/021283
§ 371 (c)(1),
(2) Date: Sep. 1, 2022

(87) PCT Pub. No.: WO2021/178942
PCT Pub. Date: Sep. 10, 2021

(65) Prior Publication Data
US 2023/0121269 A1 Apr. 20, 2023

Related U.S. Application Data

(60) Provisional application No. 62/986,437, filed on Mar. 6, 2020.

(51) Int. Cl.
G01V 1/38 (2006.01)
G01V 1/30 (2006.01)
G01V 1/36 (2006.01)

(52) U.S. Cl.
CPC ............ *G01V 1/3808* (2013.01); *G01V 1/307* (2013.01); *G01V 1/362* (2013.01);
(Continued)

(58) Field of Classification Search
CPC ...... G01V 1/3808; G01V 1/307; G01V 1/362; G01V 2210/1293; G01V 2210/1423; G01V 2210/21; G01V 2210/57
See application file for complete search history.

(56) References Cited

U.S. PATENT DOCUMENTS

2012/0073824 A1\* 3/2012 Routh .................. G01V 1/28
703/10
2013/0301386 A1\* 11/2013 Grion .................. G01V 1/364
367/24
(Continued)

OTHER PUBLICATIONS

Özbek et al. ("Anti-alias Optimal Interpolation With Priors." Paper presented at the 2010 SEG Annual Meeting, Denver, Colorado, Oct. 2010) (Year: 2010).\*
(Continued)

Primary Examiner — Luke D Ratcliffe
Assistant Examiner — Christopher Richard Walker
(74) Attorney, Agent, or Firm — Jeffrey D. Frantz

(57) ABSTRACT

A method can include receiving seismic survey data of a subsurface environment from a seismic survey that includes a source arrangement of sources that is spatially denser than a receiver arrangement of receivers; processing the seismic survey data using the principle of reciprocity for performing interpolation across the receivers to generate processed seismic survey data; and generating an image of at least a portion of the subsurface environment using the processed seismic survey data.

20 Claims, 14 Drawing Sheets

(52) U.S. Cl.
CPC ............... *G01V 2210/1293* (2013.01); *G01V 2210/1423* (2013.01); *G01V 2210/21* (2013.01); *G01V 2210/57* (2013.01)

(56) References Cited

U.S. PATENT DOCUMENTS

| | | | | |
|---|---|---|---|---|
| 2014/0297192 | A1* | 10/2014 | Nguyen | G01V 1/30 702/14 |
| 2015/0362611 | A1* | 12/2015 | Lecerf | G01V 1/28 367/7 |
| 2016/0187514 | A1* | 6/2016 | Dellinger | G06F 30/00 367/24 |
| 2017/0031041 | A1 | 2/2017 | Ratcliffe et al. | |
| 2017/0115415 | A1* | 4/2017 | Ozbek | G01V 1/282 |
| 2017/0115419 | A1* | 4/2017 | van Groenestijn | G01V 1/3861 |
| 2019/0018157 | A1* | 1/2019 | Robertsson | G01V 1/3852 |
| 2019/0079205 | A1* | 3/2019 | Van Manen | G01V 1/364 |

OTHER PUBLICATIONS

Zwartjes et al. ("Fourier reconstruction of nonuniformly sampled, aliased seismic data", Geophysics 2007 72:1, V21-V32) (Year: 2007).*

Dutt and Rokhlin, "Fast Fourier Transforms for Nonequispaced Data", SIAM Journal on Scientific Computing, 14(6), pp. 1368-1393, Nov. 1993.

Hennenfent and Herrmann, "Simply denoise: Wavefield reconstruction via jittered undersampling", Geophysics, 73(3), pp. V19-V28, 2008.

Keiner et al., "Using NFFT 3—a software library for various nonequispaced fast Fourier transforms", ACM Transactions on Mathematical Software (TOMS), 36(4), pp. 1-23, 2008.

Kragh et al., "Efficient broadband marine acquisition and processing for improved resolution and deep imaging", The Leading Edge, 29, pp. 464-469, Apr. 2010.

Kreimer and Sacchi, "A tensor higher-order singular value decomposition for prestack seismic data noise reduction and interpolation", Geophysics, 77(3), pp. V113-V122, May 2012.

Kumar et al., "Efficient matrix completion for seismic data reconstruction". Geophysics, 80(5), pp. V97-V114, Sep. 2015.

Liu and Sacchi, "Minimum weighted norm interpolation of seismic records", Geophysics, 69 (6), pp. 1560-1568, Nov.-Dec. 2004.

Mallat and Zhang, "Matching pursuits with time-frequency dictionaries", IEEE Transactions on Signal Processing, vol. 41, No. 12, pp. 3397-3415, Dec. 1993.

Moore et al., "Quality control and bandwidth optimization of compact Fourier interpolation operators", 78th Annual International Meeting, SEG, Expanded Abstracts, pp. 2978-2982, 2008.

Nguyen and Winnett, "Seismic interpolation by optimally matched Fourier components", 81st Annual International Meeting, SEG, Expanded Abstracts, 3085-3089, 2011.

Nichols, "Dealiasing band-limited data using a spectral continuity constraint", 62nd Annual International Meeting, SEG, Expanded Abstracts, pp. 1183-1186, 1992.

Özbek et al., "Anti-alias optimal interpolation with priors", 80th Annual International Meeting, SEG, Expanded Abstracts, pp. 3401-3405, 2010.

Schonewille et al., "Seismic data regularization with the anti-alias antileakage Fourier transform", First Break, 27, No. 9, pp. 85-92, Sep. 2009.

Schonewille et al., "Matching pursuit Fourier interpolation using priors derived from a second data set", In SEG Technical Program Expanded Abstracts 2013, pp. 3651-3655, 2013.

Spitz, "Seismic trace interpolation in the F-X domain", Geophysics, 56, pp. 785-794, Jun. 1991.

Trickett et al., "Rank-reduction-based trace interpolation", 80th Annual International Meeting, SEG, Expanded Abstracts, pp. 3829-3833, 2010.

Xu et al., "Antileakage Fourier transform for seismic data regularization in higher dimensions", Geophysics, vol. 75, No. 4, pp. WB113-WB120.

Search Report and Written Opinion of International Patent Application No. PCT/US2021/021283 on Jun. 28, 2021; 9 pages.

Extended Search issued in European Patent Application No. 21765146.2 dated Feb. 16, 2024, 6 pages.

International Preliminary Report on Patentability issued in International Patent Application PCT/US2021/021283 dated Sep. 15, 2022, 6 pages.

* cited by examiner

Common Shot 910

Common Receiver 920

Common Shot 930

Common Receiver 940

Shot Gather 950

MARINE SEISMIC IMAGING

RELATED APPLICATIONS

This application is a National Stage Entry of International Application No. PCT/US2021/021283, filed Mar. 8, 2021, which claims the benefit of and priority to a U.S. Provisional Application having Ser. No. 62/986,437, filed Mar. 6, 2020, which is incorporated by reference herein.

BACKGROUND

Reflection seismology finds use in geophysics to estimate properties of subsurface formations. Reflection seismology may provide seismic data representing waves of elastic energy as transmitted by P-waves and S-waves, in a frequency range of approximately 1 Hz to approximately 100 Hz. Seismic data may be processed and interpreted to understand better composition, fluid content, extent and geometry of subsurface rocks.

SUMMARY

A method can include receiving seismic survey data of a subsurface environment from a seismic survey that includes a source arrangement of sources that is spatially denser than a receiver arrangement of receivers; processing the seismic survey data using the principle of reciprocity for performing interpolation across the receivers to generate processed seismic survey data; and generating an image of at least a portion of the subsurface environment using the processed seismic survey data. A system can include a processor; memory operatively coupled to the processor; and processor-executable instructions stored in the memory to instruct the system to: receive seismic survey data of a subsurface environment from a seismic survey that includes a source arrangement of sources that is spatially denser than a receiver arrangement of receivers; process the seismic survey data using the principle of reciprocity to perform interpolation across the receivers to generate processed seismic survey data; and generate an image of at least a portion of the subsurface environment using the processed seismic survey data. One or more computer-readable storage media can include computer-executable instructions executable to instruct a computing system to: receive seismic survey data of a subsurface environment from a seismic survey that includes a source arrangement of sources that is spatially denser than a receiver arrangement of receivers; process the seismic survey data using the principle of reciprocity to perform interpolation across the receivers to generate processed seismic survey data; and generate an image of at least a portion of the subsurface environment using the processed seismic survey data. Various other examples of methods, systems, devices, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

FIG. 9 illustrates examples of images;

DETAILED DESCRIPTION

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

As mentioned, reflection seismology finds use in geophysics to estimate properties of subsurface formations. Reflection seismology can provide seismic data representing waves of elastic energy, as transmitted by P-waves and S-waves, in a frequency range of approximately 1 Hz to approximately 100 Hz or optionally less than 1 Hz and/or optionally more than 100 Hz. Seismic data may be processed and interpreted to understand better composition, fluid content, extent and geometry of subsurface rocks.

Figure 1:
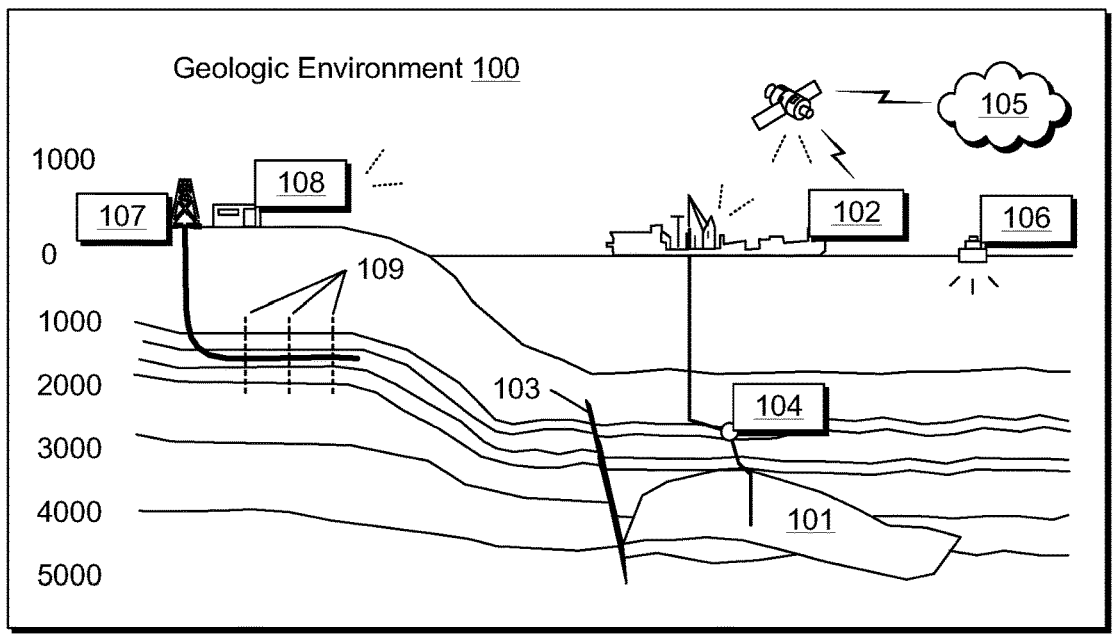
FIG. 1 illustrates an example of a geologic environment and an example of a technique.
Figure 1:
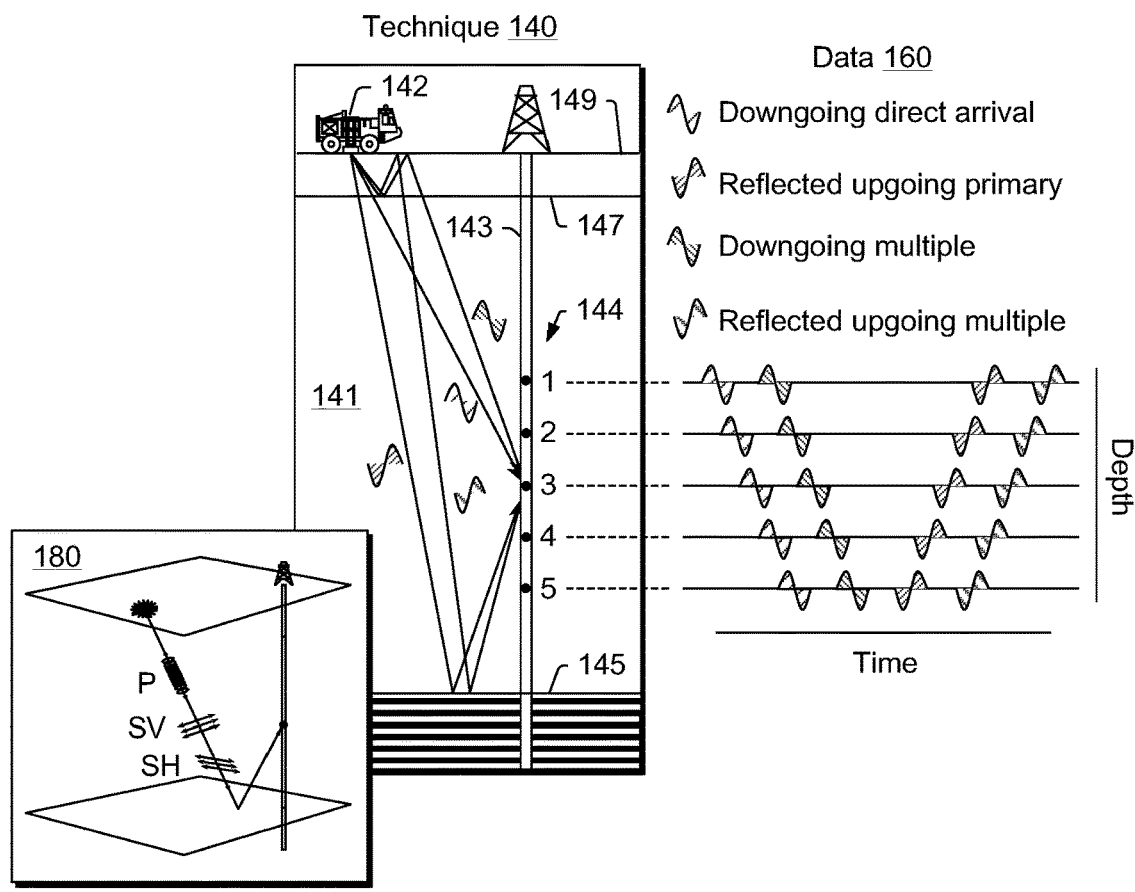

FIG. 1 shows a geologic environment 100 (an environment that includes a sedimentary basin, a reservoir 101, a fault 103, one or more fractures 109, etc.) and an acquisition technique 140 to acquire seismic data (see data 160). A system may process data acquired by the technique 140 to allow for direct or indirect management of sensing, drilling, injecting, extracting, etc., with respect to the geologic environment 100. In turn, further information about the geologic environment 100 may become available as feedback (optionally as input to the system). An operation may pertain to a reservoir that exists in the geologic environment 100 such as the reservoir 101. A technique may provide information (as an output) that specifies one or more location coordinates of a feature in a geologic environment, one or more characteristics of a feature in a geologic environment, etc.

The geologic environment 100 may be referred to as a formation or may be described as including one or more formations. A formation may be a unit of lithostratigraphy such as a body of rock that is sufficiently distinctive and continuous.

A system may be implemented to process seismic data, optionally in combination with other data. Processing of data may include generating one or more seismic attributes, rendering information to a display or displays, etc. A process or workflow may include interpretation, which may be performed by an operator that examines renderings of information (to one or more displays, etc.) and that identifies structure or other features within such renderings. Interpretation may be or include analyses of data with a goal to generate one or more models and/or predictions (about properties and/or structures of a subsurface region).

A system may include features of a framework such as the PETREL seismic to simulation software framework (Schlumberger Limited, Houston, Texas). Such a framework can receive seismic data and other data and allow for interpreting data to determine structures that can be utilized in building a simulation model.

A system may include add-ons or plug-ins that operate according to specifications of a framework environment. A framework environment such as, for example, the OCEAN framework environment (Schlumberger Limited, Houston, Texas) may be utilized, which allows for integration of add-ons (or plug-ins) into a PETREL framework workflow. The OCEAN framework environment leverages .NET tools (Microsoft Corporation, Redmond, Washington) and offers stable, user-friendly interfaces for efficient development.

As an example, a framework may be implemented within or in a manner operatively coupled to the DELFI cognitive exploration and production (E&P) environment (Schlumberger, Houston, Texas), which is a secure, cognitive, cloud-based collaborative environment that integrates data and workflows with digital technologies, such as artificial intelligence and machine learning. As an example, such an environment can provide for operations that involve one or more frameworks.

Seismic data may be processed using a framework such as the OMEGA framework (Schlumberger Limited, Houston, TX). The OMEGA framework provides features that can be implemented for processing of seismic data through prestack seismic interpretation and seismic inversion.

A framework for processing data may include features for 2D line and 3D seismic surveys. Modules for processing seismic data may include features for prestack seismic interpretation (PSI), optionally pluggable into a framework such as the OCEAN framework.

In FIG. 1, the geologic environment 100 includes an offshore portion and an on-shore portion. A geologic environment may be or include one or more of an offshore geologic environment, a seabed geologic environment, an ocean bed geologic environment, etc.

The geologic environment 100 may be outfitted with one or more of a variety of sensors, detectors, actuators, etc. Equipment 102 may include communication circuitry that receives and that transmits information with respect to one or more networks 105. Such information may include information associated with downhole equipment 104, which may be equipment to acquire information, to assist with resource recovery, etc. Other equipment 106 may be located remote from a well site and include sensing, detecting, emitting or other circuitry and/or be located on a seabed. Such equipment may include storage and communication circuitry that stores and that communicates data, instructions, etc. One or more satellites may be provided for purposes of communications, data acquisition, etc. FIG. 1 shows a satellite in communication with the network 105 that may be configured for communications, noting that the satellite may additionally or alternatively include circuitry for imagery (spatial, spectral, temporal, radiometric, etc.).

FIG. 1 also shows the geologic environment 100 as optionally including equipment 107 and 108 associated with a well that includes a substantially horizontal portion that may intersect with one or more of the one or more fractures 109; consider a well in a shale formation that may include natural fractures, artificial fractures (hydraulic fractures) or a combination of natural and artificial fractures. The equipment 107 and/or 108 may include components, a system, systems, etc. for fracturing, seismic sensing, analysis of seismic data, assessment of one or more fractures, etc.

A system may be used to perform one or more workflows. A workflow may be a process that includes a number of worksteps. A workstep may operate on data to create new data, to update existing data, etc. A system may operate on one or more inputs and create one or more results based on one or more algorithms. A workflow may be a workflow implementable in the PETREL software that operates on seismic data, seismic attribute(s), etc. A workflow may be a process implementable in the OCEAN framework, the DELFI environment, etc. A workflow may include one or more worksteps that access a plug-in (external executable code, etc.). A workflow may include rendering information to a display (a display device). A workflow may include receiving instructions to interact with rendered information to process information and optionally render processed information. A workflow may include transmitting information that may control, adjust, initiate, etc. one or more operations of equipment associated with a geologic environment (in the environment, above the environment, etc.).

In FIG. 1, the technique 140 may be implemented with respect to a geologic environment 141. As shown, an energy source (a transmitter) 142 may emit energy where the energy travels as waves that interact with the geologic environment 141. The geologic environment 141 may include a bore 143 where one or more sensors (receivers) 144 may be positioned in the bore 143. Energy emitted by the energy source 142 may interact with a layer (a structure, an interface, etc.) 145 in the geologic environment 141 such that a portion of the energy is reflected, which may then be sensed by one or more of the sensors 144. Such energy may be reflected as an upgoing primary wave (or "primary" or "singly" reflected wave). A portion of emitted energy may be reflected by more than one structure in the geologic environment and referred to as a multiple reflected wave (or "multiple"). The geologic environment 141 is shown as including a layer 147 that resides below a surface layer 149. Given such an environment and arrangement of the source 142 and the one or more sensors 144, energy may be sensed as being associated with particular types of waves.

A "multiple" may refer to multiply reflected seismic energy or an event in seismic data that has incurred more than one reflection in its travel path. Seismic data may include evidence of an interbed multiple from bed interfaces, evidence of a multiple from a water interface (an interface of a base of water and rock or sediment beneath it) or evidence of a multiple from an air-water interface, etc.

As shown in FIG. 1, the acquired data 160 can include data associated with downgoing direct arrival waves, reflected upgoing primary waves, downgoing multiple reflected waves and reflected upgoing multiple reflected waves. The acquired data 160 is also shown along a time axis and a depth axis. As indicated, in a manner dependent at least in part on characteristics of media in the geologic environment 141, waves travel at velocities over distances such that relationships may exist between time and space. Thus, time information, as associated with sensed energy, may allow for understanding spatial relations of layers, interfaces, structures, etc. in a geologic environment.

FIG. 1 also shows various types of waves as including P, SV an SH waves. A P-wave can be an elastic body wave or sound wave in which particles oscillate in the direction the wave propagates. P-waves incident on an interface (at other than normal incidence, etc.) may produce reflected and transmitted S-waves ("converted" waves). An S-wave or shear wave may be an elastic body wave in which particles oscillate perpendicular to the direction in which the wave propagates. S-waves may be generated by a seismic energy sources (other than an air gun). S-waves may be converted to P-waves. S-waves tend to travel more slowly than P-waves and do not travel through fluids that do not support shear. Recording of S-waves involves use of one or more receivers operatively coupled to earth (capable of receiving shear forces with respect to time). Interpretation of S-waves may allow for determination of rock properties such as fracture density and orientation, Poisson's ratio and rock type by crossplotting P-wave and S-wave velocities, and/or by other techniques. Parameters that may characterize anisotropy of media (seismic anisotropy) include the Thomsen parameters ε, δ and γ.

Seismic data may be acquired for a region in the form of traces. In FIG. 1, the technique 140 may include the source 142 for emitting energy where portions of such energy (directly and/or reflected) may be received via the one or more sensors 144. Energy received may be discretized by an analog-to-digital converter that operates at a sampling rate. Acquisition equipment may convert energy signals sensed by a sensor to digital samples at a rate of one sample per approximately 4 ms. Given a speed of sound in a medium or media, a sample rate may be converted to an approximate distance. The speed of sound in rock may be of the order of around 5 km per second. Thus, a sample time spacing of approximately 4 ms would correspond to a sample "depth" spacing of about 10 meters (assuming a path length from source to boundary and boundary to sensor). A trace may be about 4 seconds in duration; thus, for a sampling rate of one sample at about 4 ms intervals, such a trace would include about 1000 samples where latter acquired samples correspond to deeper reflection boundaries. If the 4 second trace duration of the foregoing scenario is divided by two (to account for reflection), for a vertically aligned source and sensor, the deepest boundary depth may be estimated to be about 10 km (assuming a speed of sound of about 5 km per second).

Figure 2:
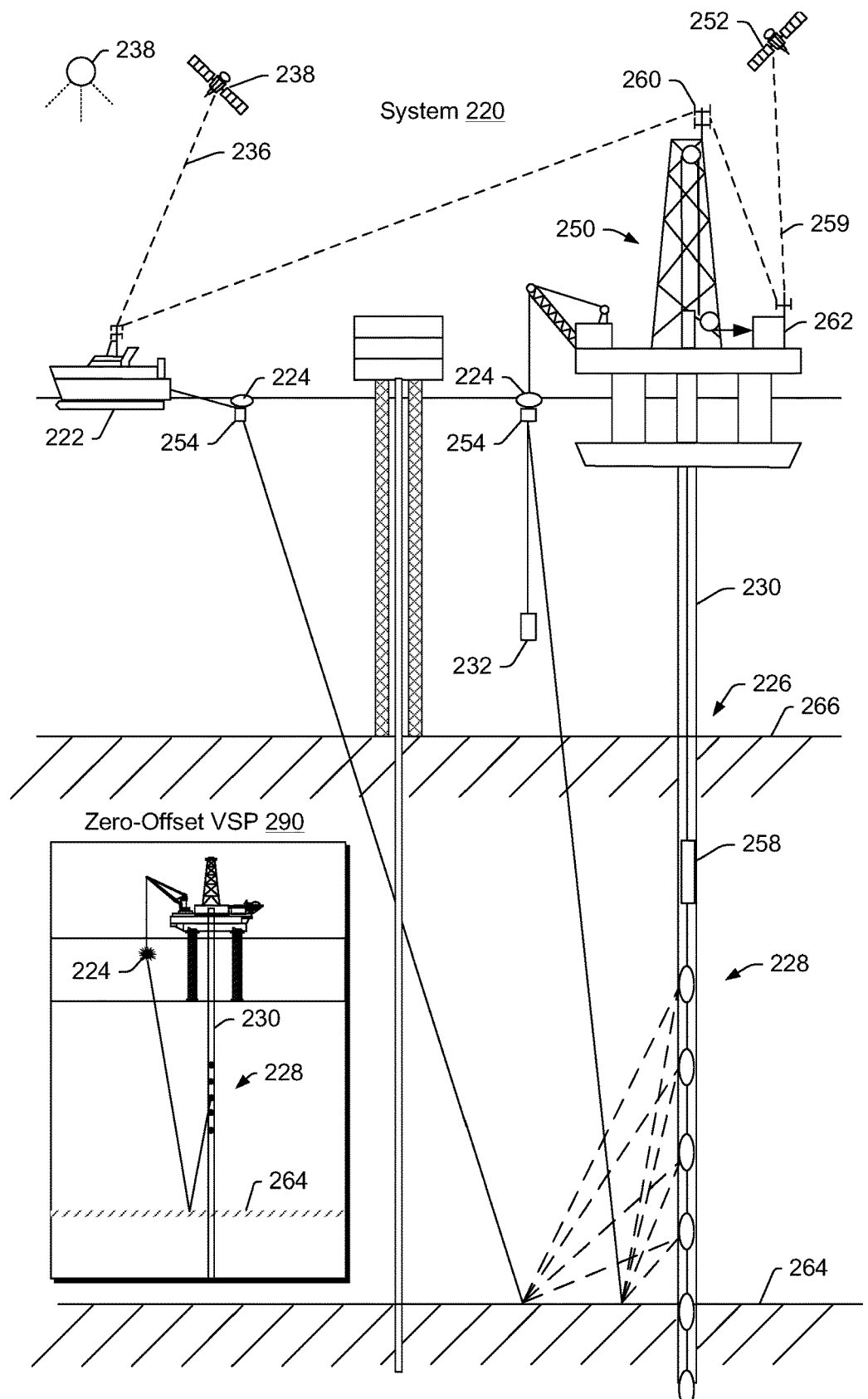
FIG. 2 illustrates an example of a system.

FIG. 2 shows a system 220 in which one or more vessels 222 may be employed to enable seismic profiling such as three-dimensional vertical seismic profiling (VSP), rig/offset vertical seismic profiling (VSP), etc. In FIG. 2, the system 220 is illustrated as including a rig 250, the vessel 222, and one or more acoustic receivers 228 (a receiver array). The vessel 222 may include a source 224 (or source array) and/or the rig 250 may include a source 224 (or source array).

The vessel 222 may travel a path or paths where locations may be recorded through the use of navigation system signals 236. Such signals may be associated with a satellite-based system that includes one or more satellites 238 and 252. The satellite 238 may be part of a global positioning system (GPS), which may be implemented to record position, speed, direction, and other parameters of the vessel 222. One or more satellites, communication equipment, etc. may be configured to provide for VSAT communications, VHF communications, UHF communications, etc.

In FIG. 2, the acoustic receivers 228 may be part of a data acquisition system 226 that may be deployed in borehole 230 via one or more of a variety of delivery systems, such as wireline delivery systems, slickline delivery systems, or one or more other types suitable delivery systems. The acoustic receivers 228 may be communicatively coupled with processing equipment 258, which may be positioned at a downhole location. Processing equipment 258 may include a telemetry system for transmitting data from acoustic receivers 228 to additional processing equipment 262 located at the surface, on the rig 250 and/or vessels 222. Information acquired may optionally be transmitted (see signals 259).

Depending on the specifics of a given data communication system, surface processing equipment 262 may include a radio repeater 260 and/or one or more of a variety of other and/or additional signal transfer components and signal processing components. The acoustic receivers 228 may be coupled to the surface processing equipment 262 via one or more wire connections; noting that additionally or alternatively wireless and/or optical connections may be employed.

The surface processing equipment 262 may include a synchronization unit to assist with coordination of emissions from one or more sources (optionally dithered (delayed) source arrays). Coordination may extend to one or more receivers (consider the acoustic receivers 228 located in borehole 230). A synchronization unit may use coordinated universal time, optionally employed in cooperation with a global positioning system (to obtain UTC data from GPS receivers of a GPS system).

FIG. 2 illustrates equipment for performing seismic profiling. The seismic profiling may include three-dimensional vertical seismic profiling (VSP) but other applications may utilize rig/offset vertical seismic profiling or seismic profiling employing walkaway lines. An offset source may be provided by the source 224 located on the rig 250, on the vessel 222, and/or on another vessel or structure (stationary and/or movable from one location to another location).

A system may employ one or more of various arrangements of a source or sources on a vessel(s) and/or a rig(s). As shown in FIG. 2, the acoustic receivers 228 of downhole acquisition system 226 are configured to receive the source signals, at least some of which are reflected off a reflection boundary 264 located beneath a sea bottom 236. The acoustic receivers 228 may generate data streams that are relayed uphole to a suitable processing system such as the processing system 262.

While the acoustic receivers 228 may generate data streams, a navigation system may determine a real-time speed, position, and direction of the vessel 222 and also estimate initial shot times accomplished via signal generators 254 of the appropriate source 224 (or source array). A source controller may be part of the surface processing equipment 262 (located on the rig 250, on the vessel 222, or at other suitable location) and may be configured with circuitry that can control firing of acoustic source generated signals so that the timing of an additional shot time (optionally a shot time via a slave vessel) may be based on an initial shot time (a shot time via a master vessel) plus a dither value.

A synchronization unit of the surface processing equipment 262, may coordinate firing of dithered acoustic signals with recording of acoustic signals by the downhole acquisition system 226. A processor system may be configured to separate a data stream of the initial shot and a data stream of the additional shot via a coherency filter. An approach may employ simultaneous acquisition and/or may not perform separation of the data streams. In such cases, the dither may be effectively zero.

After an initial shot time at T=0 (T0) is determined, subsequent firings of acoustic source arrays may be offset by a dither. The dithers may be positive or negative and sometimes created as pre-defined random delays. Use of dithers facilitates the separation of simultaneous or near-simultaneous data sets to simplify the data processing. The ability to have acoustic source arrays fire in simultaneous or near-simultaneous patterns reduces the overall amount of time used for three-dimensional vertical seismic profiling source acquisition. This, in turn, may help to reduce overall cost of a seismic operation.

Also shown in FIG. 2 is an inset of a zero-offset vertical seismic profile (VSP) scenario 290. In such a scenario, an acquisition geometry may be limited to an ability to position equipment that is physically coupled to the rig 250. As shown, for given the acquisition geometry, there may be no substantial offset between the source 224 and bore 230. In such a scenario, a zero-offset VSP may be acquired where seismic waves travel substantially vertically down to a reflector (see the layer 264) and up to the receiver 228, which may be a receiver array. Where one or more vessels are employed (see the vessel 222), one or more other types of surveys may be performed. A three-dimensional VSP may be performed using a vessel.

Figure 3:
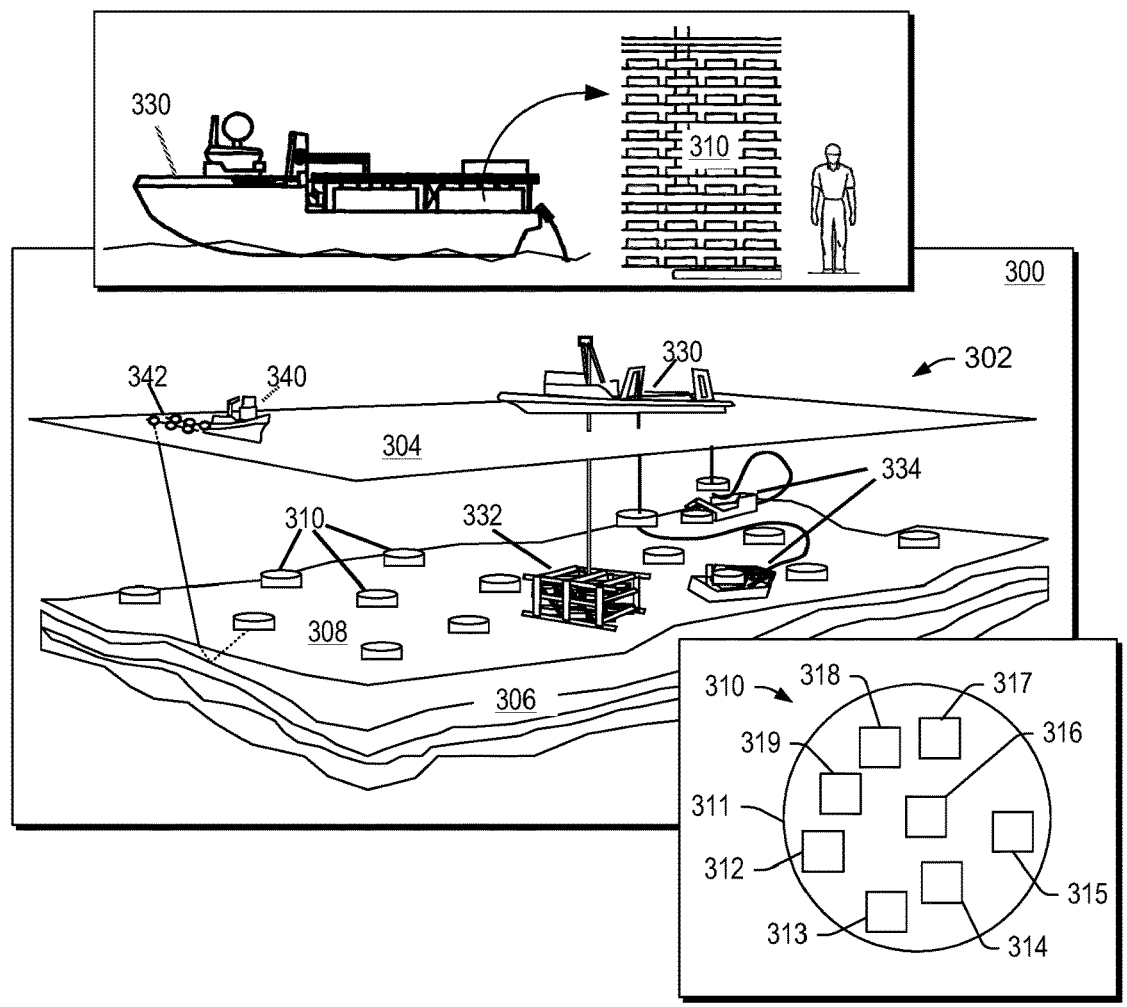
FIG. 3 illustrates an example of a system, an example of a node, an example of a method, and an example of a computing system.
Figure 3:
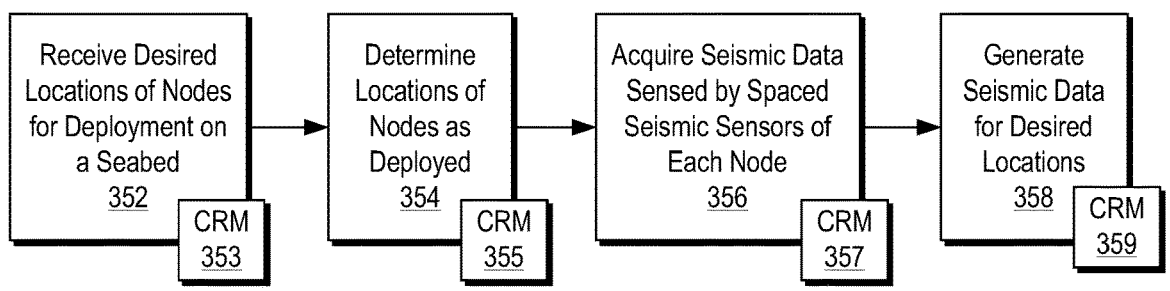
Figure 3:
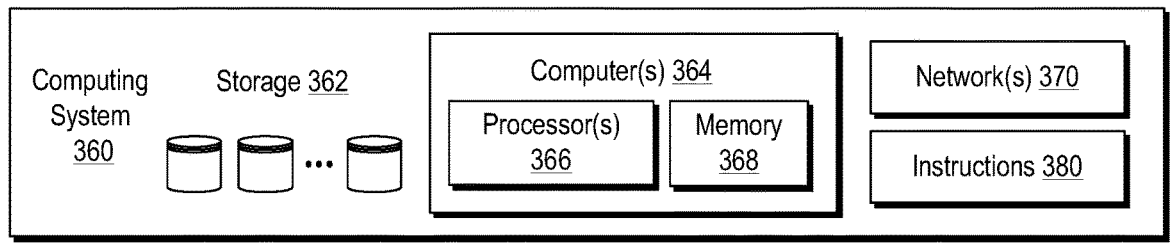

FIG. 3 shows a system 300 for acquisition of information in a geologic environment 302, an example of a method 350 and an example of a system 360. As shown, the system 300 can include an air-water surface 304, a formation 306 and a seabed 308 where nodes 310 are positioned on the seabed 304. Equipment may be utilized to position the nodes 310 on the seabed 304 and retrieve the nodes 310 from the seabed 304. Such equipment may include one or more vessels 330, one or more carriers 332 and one or more vehicles 334, which may be autonomous, semi-autonomous, etc. (remotely operated vehicles (ROVs), etc.). The system 300 may include a seismic source vessel 340 that includes one or more seismic sources 342. The seismic source vessel 340 may travel a path while, at times, emitting seismic energy from the one or more sources 342. In such an approach, the nodes 310 can receive portions of the seismic energy, which can include portions that have travelled through the formation 306. Analysis of received seismic energy by the nodes 310 may reveal features of the formation 306.

In FIG. 3, the vessel 330 is shown as including nodes 310 as cargo arranged on racks. The nodes 310 can be deployed to form an array. An array of nodes may be cabled or un-cabled. A cable may be relatively light weight and utilized to deploy a node receiver line with nodes coupled to the cable at spaced intervals. A rack can be utilized to securely store nodes in slots along multiple rows and columns. An individual slot may include a communications portal that can establish communication via contact(s) and/or contactless/wireless with an individual node seated in the individual slot for download of information, etc. A rack can include charger circuitry that can charge one or more batteries of an individual node seated in an individual slot. A node can be sealed such that components (circuitry, one or more batteries, etc.) are not exposed to water when the node is deployed on an underwater bed. A seal may be a hermetic seal that aims to prevent passage of air and/or water. A seal or seals can aim to prevent intrusion of water from an exterior region to an interior region of a node. Such a node can be considered to be water-tight. A sealed node can be a self-contained piece of equipment that can sense information independent of other equipment when positioned on an underwater surface that may be a seabed.

A rack may be dimensioned in accordance with shipping container dimensions such as about 3 meters by about 7 meters by about 3 meters. As shown in FIG. 3, with reference to a silhouette of a person that is about 1.8 meters in height, a node may be about a meter or less in diameter and about half a meter in height or less.

In FIG. 3, the one or more sources 342 may be an air gun or air gun array (a source array). A source can produce a pressure signal that propagates through water into a formation where acoustic and elastic waves are formed through interaction with features (structures, fluids, etc.) in the formation. Acoustic waves can be characterized by pressure changes and a particle displacement in a direction of which the acoustic wave travels. Elastic waves can be characterized by a change in local stress in material and a particle displacement. Acoustic and elastic waves may be referred to as pressure and shear waves, respectively; noting that shear waves may not propagate in water. Collectively, acoustic and elastic waves may be referred to as a seismic wavefield.

Material in a formation may be characterized by one or more physical parameters such as density, compressibility, and porosity. In the geologic environment 302 of FIG. 3, energy emitted from the one or more sources 342 can be transmitted to the formation 306; however, elastic waves that reach the seabed 308 will not propagate back into the water. Such elastic waves may be received by sensors of the nodes 310. The nodes 310 can include motion sensors that can measure one or more of displacement, velocity and acceleration. A motion sensor may be a geophone, an accelerometer, etc. As to pressure waves, the nodes 310 can include pressure wave sensors such as hydrophones.

In FIG. 3, the nodes 310 can include sensors for acquiring seismic wavefield information at the seabed 308. Each of the nodes 310 can include one or more hydrophones and/or one or more motion sensors (one or more geophones, one or more accelerometers, etc.).

A node can include various types of circuitry. Such circuitry can include circuitry that can digitize (analog to digital conversion ADC circuitry) and can include circuitry that can record signals (a microcontroller, a processor, etc., operatively coupled to memory). Each of the nodes 310 can include a housing 311, sensors 312 and 313, one or more microcontrollers or processors 314, one or more batteries 315, memory 316, ADC circuitry 317, a compass 318, communication circuitry 319, etc. Various components of a node may be operatively coupled via wires, connectors, etc. A node can include one or more circuit boards (printed circuit boards, etc.) that can provide for electrical connections between various components, etc.

After deployment, one or more acoustic techniques may be utilized to determine node locations. A technique may employ acoustic pinging where acoustic pingers emit relatively high-frequency pings that are substantially above the maximum frequency of interest for seismic applications. Such relatively high-frequency acoustic signals can be picked up by one or more seismic sensors. Triangulation or one or more other techniques may be utilized to determine node locations for nodes deployed on an underwater surface such as a seabed.

Nodes may be utilized to acquire information spatially and temporally such as in a time-lapse seismic survey, which may be a four-dimensional seismic survey (4D seismic survey). A seismic image of a formation may be made for a first survey and a seismic image of the formation may be made for a second survey where the first and second surveys are separated by time (lapse in time). In such an approach, a comparison of the images can infer changes in formation properties that may be tied to production of hydrocarbons, injection of water or gas, etc.

A first survey may be referred to as a baseline survey, while a subsequent survey may be referred to as a monitor survey. To minimize artifacts in differences between seismic images from successive lapses, a monitor survey may aim to replicate a configuration of a corresponding baseline survey. Where nodes are utilized at various positions on a seabed for a baseline survey, a monitor survey may aim to place nodes on the seabed in a manner that replicates the various positions of the nodes of the baseline survey. For the monitor survey, the nodes may be the same nodes, include some of the same nodes, include some different nodes or may be different nodes. A service may have a stock of nodes that can be utilized for various surveys where once a survey is complete, the nodes are retrieved, transported and positioned for another survey. Such a service may update, replace, etc., nodes from time to time.

A position to within a few meters of accuracy of one or more nodes may be determined via one or more of GPS, an acoustic positioning system (a short-baseline (SBL) or ultra-short baseline (USBL) acoustic system), and one or more other types of systems.

A node can include sensor circuitry for acquiring measurements of a seismic pressure wavefield and its gradient; consider sensor circuitry that can measure a seismic pressure wavefield and its gradient in vertical and crossline directions.

A node can include point-receiver circuitry. A point-receiver approach can combine hydrophones with tri-axial microelectromechanical system (MEMS) accelerometers. In such an approach, the MEMS accelerometers can measure a substantial bandwidth of particle acceleration due to seismic wavefields. Measurements of particle acceleration can be directly related to a gradient in a pressure wavefield. A node may include the ISOMETRIX technology, which includes point-receiver circuitry (Schlumberger Limited, Houston, Texas).

FIG. 3 also shows the method 350 as including a reception block 352 for receiving desired locations of nodes for deployment on a seabed of a seismic survey where each of the nodes includes a sealed housing and, within the sealed housing, at least one battery and spaced seismic sensors electrically powered by the at least one battery; a determination block 354 for determining locations of the nodes as deployed on the seabed where at least some of the determined locations differ from their corresponding desired locations; an acquisition block 356 for acquiring seismic data sensed by the spaced seismic sensors of the nodes where the acquired seismic data corresponds to the determined locations; and a generation block 358 for, based at least in part on the acquired seismic data, a spacing of the spaced seismic sensors and the desired locations, generating seismic data for the desired locations.

The method 350 is shown in FIG. 3 in association with various computer-readable media (CRM) blocks 353, 355, 357 and 359. Such blocks generally include instructions suitable for execution by one or more processors (or cores) to instruct a computing device or system to perform one or more actions. While various blocks are shown, a single medium may be configured with instructions to allow for, at least in part, performance of various actions of the method 350 (e.g., using the computing system 360, etc.). A computer-readable medium (CRM) may be a computer-readable storage medium that is not a carrier wave, that is not a signal and that is non-transitory.

FIG. 3 also shows the computing system 360 as including one or more information storage devices 362, one or more computers 364, one or more network interfaces 370 and instructions 380. As to the one or more computers 364, each computer may include one or more processors (or processing cores) 366 and memory 368 for storing instructions executable by at least one of the one or more processors. A computer may include one or more network interfaces (wired or wireless), one or more graphics cards, a display interface (wired or wireless), etc. A system may include one or more display devices (optionally as part of a computing device, etc.). Memory can be a computer-readable storage medium. A computer-readable storage medium is not a carrier wave, is not a signal and is non-transitory.

A geophone can be a sensor configured for seismic acquisition, whether onshore and/or offshore, that can detect velocity produced by seismic waves and that can transform motion into electrical impulses. A geophone may be configured to detect motion in a single direction. A geophone may be configured to detect motion in a vertical direction. Three mutually orthogonal geophones may be used in combination to collect so-called three-component (3C) seismic data. A hydrophone may be a sensor configured for use in detecting seismic energy in the form of pressure changes under water during marine seismic acquisition. A node may include at least one geophone that can provide for motion detection and at least one hydrophone that can provide for pressure detection. Data (analog and/or digital) may be transmitted from a node (via wire, wirelessly, etc.) for processing, etc. Four-component (4C) borehole or marine seismic data can be acquired using three orthogonally-oriented geophones and a hydrophone within an ocean-bottom sensor (deployed in node-type system, a cable-type system, etc.). A 4C node in contact with the seabed (formation) can measure shear waves (geophone-based sensing) and can measure compressional waves (hydrophone-based sensing). As an example, a method may be applied to survey data from one or more of streamers, ocean bottom nodes, ocean bottom cables, etc. For example, hybrid types of data may be processed.

A source or source array may be activated periodically, such as about each 25 m (about at 10 second intervals) where the resulting sound wave travels into the Earth, which may be reflected back by one or more rock layers to one or more sensors, which may then be relayed as signals (data, information, etc.) to equipment.

Pressure data may be represented as "P" and velocity data may be represented as "Z"; noting, however, that the vertical component of a measured particle velocity vector may be denoted "V" and that "Z" may refer to a scaled, measured particle velocity. "V" may represent a measured velocity and "Z" may represent a scaling thereof.

As mentioned, a hydrophone can sense pressure information (P data) and a geophone may sense velocity information (V and/or Z data). A hydrophone may output signals, optionally as digital data for receipt by a system. A geophone may output signals, optionally as digital data for receipt by a system. The system 360 may receive P and V/Z data via one or more of the one or more network interfaces 370 and process such data via execution of the instructions 380 stored in the memory 368 as accessed by one or more of the one or more processors 366. The system 360 may store raw and/or processed data in one or more of the one or more information storage devices 362.

Referring again to the system 300 of FIG. 3, one of the nodes 310 may be connected to one or more other nodes of the nodes 310 via a cable. A vessel may include a cable that is operatively coupled to at least one node. In the system 300 of FIG. 3, nodes may be deployed according to a survey plan in a grid pattern; consider placement of nodes on a seabed according to an x,y grid where distance between adjacent nodes may be of the order of hundreds of meters. As shown in the system 300, the seismic source vessel 340 may be employed with the one or more sources 342 that can emit energy, which can, in turn, be received via one or more of the nodes 310.

Figure 4:
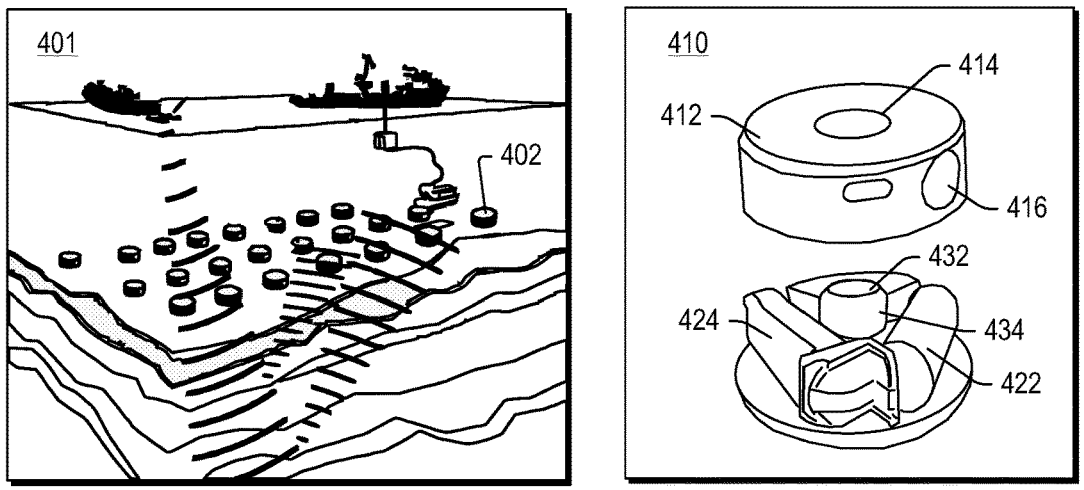
FIG. 4 illustrates an example of a node, an example of an accelerometer and an example of a hydrophone.
Figure 4:
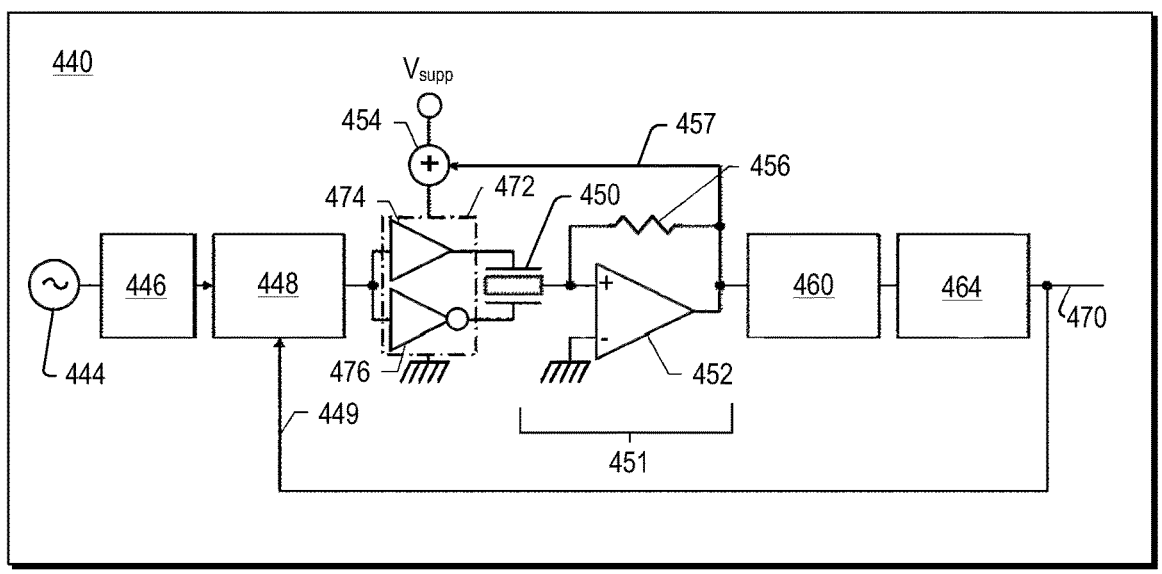
Figure 4:
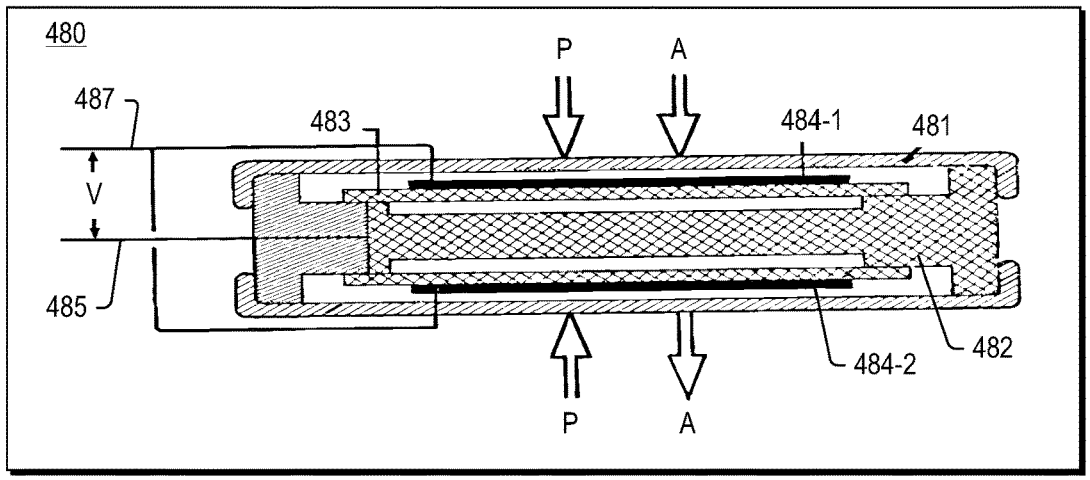

FIG. 4 shows a geologic environment 401 that includes nodes 402, a node 410, an accelerometer 440 and a hydrophone 480. As shown in FIG. 4, the node 410 can include a top cover 412, a communication antenna 414, an interface 416, one or more batteries 422, a recorder 424, a hydrophone sensor package 432 and a geophone sensor package 434. The recorder 424 can record information acquired by the hydrophone sensor package 432 and/or the geophone sensor package 434. Information acquired by the node 410 may be transmitted via the communication antenna 414 to a receiver, which may be part of communication equipment carried by a vessel, etc. The node 410 may be positioned on a seafloor via a vehicle (a remotely operated vehicle, a robot, etc.).

As shown in FIG. 4, the nodes 402 may be positioned over a particular area of the seafloor as specified by a seismic survey plan. The nodes 402 may be positioned in a grid pattern. Such a grid pattern may specify a distance or distances between neighboring nodes. An array of nodes such as the nodes 402 may be referred to as a patch. Information acquired by nodes can be processed and analyzed to increase understanding of structures in a subseafloor environment.

One or more of the accelerometers 440 may be included in the geophone sensor package 434. As to the hydrophone sensor package 432, it can include a single pressure sensor or more than one pressure sensor.

As shown in FIG. 4, the accelerometer 440 can include a system clock generator 444, a jitter filter 446, a pulse generator 448, a return connection 449, a sensor 450, a charge amplifier 451, an operational amplifier 452, an adder 454, a resistor 456, an adder connection 457, an amplitude detector 460, a loop controller 464, a digital output 470 and logic 472 with complimentary drivers 474 and 476.

In FIG. 4, the accelerometer 440 can include a capacitive MEMS-based sensor.

As illustrated in FIG. 4, the sensor 450 can include an armature and a pair of fixed position electrodes attached to the armature. A sensor may include a differential capacitor, in which a mobile electrode moves along a sensitive axis in response to an external acceleration.

The accelerometer 440 may be subjected to inertial forces caused by an external acceleration where a proof mass may be kept in an equilibrium position by electrostatic forces controlled via feedback circuitry. In FIG. 4, the amplitude detector 460 and the loop controller 464 can provide a substantially high gain where residual movement of a mobile mass with respect to its equilibrium position may be kept close to a null point. In such an approach, magnitude and direction of a net restoring force can be a difference between attractive forces working in opposite directions.

A type of noise, referred to as sampling noise, can be defined as kT/C noise (thermal noise), which may be introduced by switching and can degrade a dynamic range of a sensor. In FIG. 4, the accelerometer 440 can include the charge amplifier 451 configured with an input terminal that is continuously connected to a mobile electrode (during times in which the sensor 450 receives both actuation and activation voltages). In such an approach, sampling noise can be reduced in comparison to circuitry that does not include such a configuration of components.

In FIG. 4, the accelerometer 440 can include a constant charge drive for the sensor 450. The charge amplifier 451 of the accelerometer 440 can modulate, or adjust, actuation voltage based on a proof mass movement, which may thereby increase available signal-to-noise ratio. As shown in FIG. 4, a feedback network can be associated with the charge amplifier 451. An output terminal of the amplifier 452 can be connected via the adder connection 457 to the adder 454, which can combine an output signal from the amplifier 452 with a supply voltage $V_{supp}$. In such an arrangement, the supply voltage that is applied to the logic 472, from the adder 454, can be modulated according to a sensed signal that as available at the output terminal of the amplifier 452; and as a result, the actuation force can be independent of the proof mass movement.

A sensor package may include a three component (3C) particle motion sensor assembly; consider a 3C accelerometer assembly. Such an assembly may acquire inline (x), crossline (y) and vertical (z) particle acceleration measurements; consider an accelerometer assembly that includes microelectromechanical system (MEMS) sensor units that sense accelerations along respective inline (x), crossline (y) and vertical (z) axes. A grid of a survey may be defined via a corresponding coordinate system (at least in inline (x) and crossline (y) directions). In a package, orientations of MEMS sensor units may be appropriately varied for purposes of alignment with corresponding axes.

In FIG. 4, as shown in an approximate cross-sectional view, the hydrophone 480 can include a sheath 481, a core 482, an electrode 483 and at least one piezoelectric element 484-1 and 484-2, which may be a ceramic-based piezoelectric element or elements. As shown, a potential (V) may be measured across wires 485 and 487 where the potential (V) varies based at least in part on response of the at least one piezoelectric element 484-1 and 484-2 to external forces such as pressure and/or acceleration.

A piezoelectric material can produce an electrical potential when it is subjected to physical deformation. A piezoelectric material can include a crystalline structure (quartz, tourmaline, a poly-crystalline ceramic, etc.). A lead zirconate titanate (PZT) may be utilized.

A hydrophone can include a plate of piezoelectric ceramic placed on an elastic electrode. In such an approach, the active element can be deformed by pressure variations in surrounding water and produce a voltage collected between the electrode and a terminal bonded to the other face. The electrode can rest on a metallic core that supports its ends and that may also limit its maximum deformation (to avoid damage to the ceramic). A hydrophone can be configured to preserve integrity even where it may be accidentally submitted to high pressures.

As the active element has mass, it can produce a voltage when it is subjected to acceleration. To diminish the effect of acceleration, a hydrophone can be assembled with elements that may be paired, as shown in FIG. 4 (see elements 484-1 and 484-2 with respect to the direction of acceleration). In such an arrangement, voltage produced by acceleration can cancel whereas voltage produced by pressure can add. While voltage is mentioned, a hydrophone may be configured with circuitry such that current provides an indication of sensed pressure.

As mentioned, a 4D seismic survey involves acquisition of 3D seismic data at different times over a particular area. Such an approach can allow for assessing changes in a producing hydrocarbon reservoir with respect to time. Changes may be observed in one or more of fluid location and saturation, pressure and temperature. 4D seismic data can be considered to be a form of time-lapse seismic data.

Nodes can be utilized as an alternative to permanent seabed cables, which have been installed in various fields to acquire 4D seismic data. Nodes can be deployed to acquire seismic data (4D seismic data) and can be retrievable after acquisition of the seismic data. A 4D seismic survey may call for one or more processes aimed at repeatability of data. One factor affecting repeatability of seismic data can be the difference in position of the receiver and the source between the two phases of a 4D survey (a baseline survey phase and a monitor survey phase).

The nodes 402 illustrated in FIG. 4 may be seismic seabed nodes that can be utilized to perform a 4D seismic survey. As mentioned, the nodes 402 may be deployed via use of a ROV. A time lapse survey can include a baseline survey phase and a monitor survey phase where each phase includes positioning nodes at locations on a seafloor. Multiple monitor surveys may optionally be performed.

Quality of 4D seismic data can depend in part on repeatability of source and receiver positions between a baseline survey phase and a monitor survey phase. Positioning repeatability demands may be determined as part of a survey development stage. Positions, as to repeatability, may be monitored during acquisitions associated with a baseline survey phase and a monitor survey phase. Such a process may be referred to as position monitoring. A survey can include monitoring positioning repeatability during acquisition such that reshoots and/or infills planned.

A framework may be implemented to monitor 4D positioning repeatability during marine acquisitions. For each trace of a monitor survey a matching function can be used to search for the most similar trace in a baseline dataset. Similarity of traces can be expressed using the normalized root mean square (NRMS). For a pair of matching traces, a number of positioning difference attributes may be derived and mapped. Such attributes can be calibrated against NRMS values measured on 4D seismic difference data. In such an approach, positioning acceptance criteria can be set based on NRMS demands for a survey. 4D positioning measurements can help to define re-shoots and infill during acquisition and may provide insight into quality and repeatability of 4D seismic data.

In an effort to acquire more subtle 4D signals, a survey may aim to reduce an NRMS value to about 10 percent or less with a corresponding source positioning error plus receiver positioning error of about 10 meters to about 80 meters, which may depend on overburden heterogeneity. Higher quality 4D survey data points may be associated with about 25 meter to about 40 meter repeatability to produce NRMS levels that are less than about 10 percent (for seismic streamer surveys of regions underlying the North Sea).

A baseline survey can include positioning of nodes according to a first grid in a first region, gathering the nodes, positioning the nodes according to a second grid in a second region, gathering the nodes and repositioning them according to the first grid in the first region (for a time-lapse survey of the first region). The nodes 402 may be positioned according to a first grid, utilized to acquire data, positioned according to a second grid and utilized to acquire data. A survey may aim to position nodes at locations that were previously used (repositioning of nodes). Such a survey may reuse nodes or may utilize new or different nodes.

A survey can include a data repeatability process where an ROV or other suitable equipment is utilized to deploy nodes at prior positions of a grid associated with a baseline survey phase of a 4D seismic survey. In such an approach, the nodes are to be repositioned as closely as possible to their prior positions. This may be considered to be a constraint on the data repeatability process. To meet such a constraint, an operator of an ROV may spend a considerable amount of time in deploying nodes to their prior positions.

A method can include deploying nodes with relaxed placement accuracy. A method can include calculating (estimating) seismic data at a baseline node position that is a short distance away from a location of a seabed receiver, using data recorded by sensors at that seabed receiver, including seismic and seismic gradient sensors.

For a survey, nodes may be deployed via an ROV, via a rope or via one or more other techniques. A rope based approach may provide for coverage of an area in a more expeditious manner than an ROV based approach that places nodes one node at a time.

As to streamer based approaches, one approach to predict the seismic data at the same location as for a previous survey, even if the receivers are located differently, can involve interpolating or reconstructing the seismic data between receivers. For towed streamer data, a method can include reconstructing seismic data between receivers using gradients where measurements of the wavefield and its gradients are available. In such an approach, via use of known gradients, it is possible to reconstruct data (values) above the Nyquist spatial sampling criteria; however, such an approach can depend on spacing, as it may be problematic to reconstruct between receivers separated by distances of more than about 125 meters to about 150 meters.

As to a node based approach, for a 4D seabed node survey, the node spacing may be of the order of 100 meters or more. A seabed node survey can utilize spacing of the about 300 meters to about 400 meters.

As an example, an OBN survey can include an acquisition scenario involving sparse ocean bottom node (OBN) acquisition where sources are fired according to a dense grid(s) and where nodes are positioned according to a sparse grid(s). As an example, an OBN survey seismic acquisition can involve approximately 50 m sampling for sources and approximately 200 m to approximately 300 m spacing of nodes in an inline direction and in a crossline direction.

Figure 5:
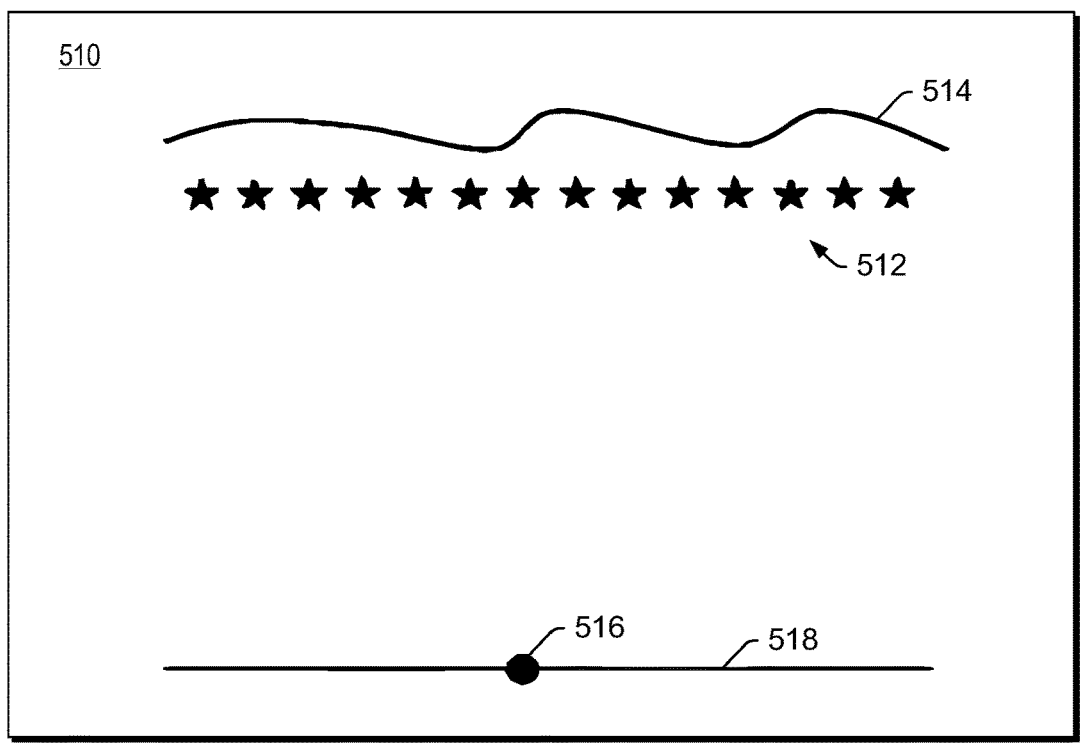
FIG. 5 illustrates example plots.
Figure 5:
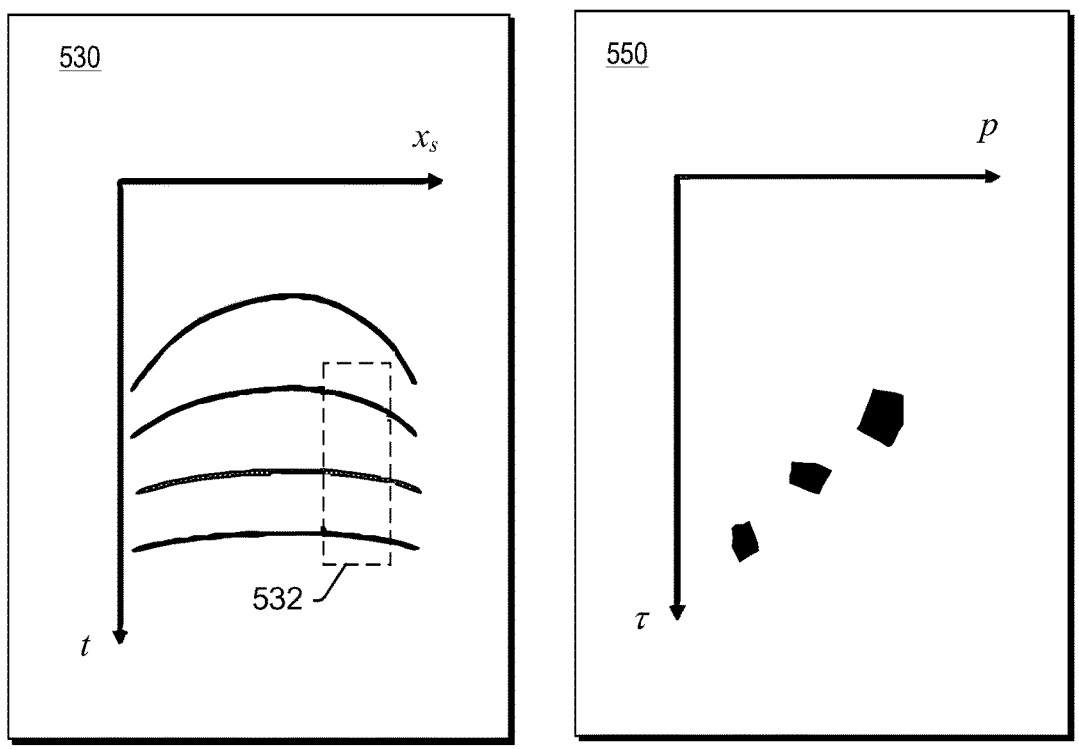

FIG. 5 shows a series of plots 510, 530 and 550. In FIG. 5, the plot 510 shows a 2D representation of an ocean bottom node (OBN) geometry where stars indicate (relatively) densely sampled sources 512 located just beneath the sea surface 514 and where a black, filled circle represents a node 516 on the seabed 518. As to the plot 530, it shows representation of a shot gather and, as to the plot 550, it shows a representation of the intercept time-slowness (tau-p) decomposition of the data in the dashed box 532 of the plot 530.

In ocean bottom acquisition, sources may be arranged according to a dense grid as shown in the plot 510 of an ocean bottom node (OBN) survey. Such an arrangement of equipment may provide for decomposing a wavefield. As an example, a method can include performing decomposition for each source location in turn (since the observed wavefield may be different for each source position) or to use a small number of sources at the same time, since for some events it can be expected that relatively small changes exist across a small number of sources. The wavefield observed at the node in the plot 510, due to the plurality of sources, can be decomposed into a number of plane waves; consider a method that can include transferring data into the intercept time-slowness (tau-p) domain (see the plots 530 and 550).

As mentioned, as an example, an OBN survey seismic acquisition can involve approximately 50 m sampling for sources and approximately 200 m to approximately 300 m spacing of nodes in an inline direction and in a crossline direction. As an example, dense can refer to a higher spatial density. For example, source locations can be more dense or dense compared to receiver locations (e.g., node locations). As an example, coarse can refer to a lower spatial density. For example, receiver locations (e.g., node locations) can be more coarse or coarse compared to source locations.

As an example, a method can be utilized for dense ocean bottom node (OBN) interpolation using priors derived from reciprocity. For example, consider using a principle of reciprocity. In such an example, a seismogram can be expected to be the same when recorded using a source at a first location and a geophone at a second location and when recorded using a geophone at the first location and a source at the second location (e.g., positions of source and geophone exchanged).

While the principle of reciprocity can hold true for an individual source-receiver pair irrespective of where sources and receivers in the medium are placed, for building priors (e.g., priors derived from reciprocity), a method can demand that a common receiver gather and a common shot gather meet one or more criteria. For example, consider one or more criteria that specify similarity to each other in terms of moveout (dip) of seismic events.

The aforementioned similarity tends to hold true when the sources and the receivers are collocated in space, which tend not to be true for OBN surveys where the sources and the receivers are placed at different depth levels.

Where depth levels differ, the seismic events in both receiver gathers and shot gathers exhibit different moveout. Again, the principle of reciprocity can remain valid for an individual pair of source and receiver in the OBN survey even if they are placed at different depth levels.

To address depth level concerns, one or more adjustments may be made as to interpolated common receiver gathers. For example, an adjustment can involve adjusting for a water velocity correction that accounts for changes in sea conditions over time, and an adjustment can involve using a constant water velocity re-datuming approach to map sources and receiver to a common datum level.

The two aforementioned adjustments aim to assure that a method can utilize the principle of reciprocity to build appropriate priors from a common receiver gather to stabilize interpolation of common shot gathers.

A datum can be an agreed and known value, such as the elevation of a benchmark or sea level, to which other measurements may be adjusted. In seismic data, the term can refer to an arbitrary planar surface to which adjustments can be made and on which sources and receivers can be assumed to lie to minimize effects of topography and near-surface zones of low velocity. As an example, a datum adjustment (e.g., or datum correction) can involve adding a value to reflection times of seismic data to compensate for the location of the geophone and source relative to the seismic datum.

Seismic data interpolation using matching pursuit Fourier interpolation (MPFI) can involve solving a least-squares optimization problem with a sparsity constraint to find the best projection of multidimensional data onto a span of an over-complete dictionary $\mathcal{D}$. In such an example, each column of the dictionary $\mathcal{D}$ can be composed of an atom $h_i$ called a basis vector, and an associated coefficient $x_i$. MPFI can find an approximate solution of the following sparsity problem:

$$\min_x \|M\mathcal{D}x - b\|_2^2 \text{ subject to } \|x\|_0 \leq N, \quad (1)$$

where b is the set of measurements, x is the coefficients of the basis vectors of a dictionary $\mathcal{D}$, $\|x\|_0$ corresponds to the total number of nonzero elements N in a vector x, and M is the sampling operator. As an example, a MPFI version can perform interpolation in the frequency-wavenumber domain, where $\mathcal{D}$ represents the non-equispaced fast Fourier transform. As an example, a MPFI based seismic data interpolation scheme may be applied for irregularly and sparsely sampled data. Although equation (1), above, can produce stable interpolation results for irregular (or random) sub-sampled data, the quality of interpolation tends to be poor when data are sampled regularly and sparsely. This is because the spectrum of seismic data can exhibit aliasing at high frequencies, for example, which can have energies akin to true events. Thus, picking the maximum energy frequency coefficients at high-frequency tends to result in both aliased and non-aliased events in interpolation, which results in sub-optimal reconstruction of seismic data.

As an example, an approach can derive priors from the non-aliased low-frequency spectrum of the interpolated data to distinguish between aliased and true events. This results in the following modified optimization problem:

$$\min_x \|M\mathcal{D}Px - b\|_2^2 \text{ subject to } \|x\|_0 \leq N, \quad (2)$$

where P is a diagonal matrix, which represents the priors derived from the low-frequency spectrum of the data itself and applied to the high-frequency spectrum. In practice, a scheme can apply priors to the interpolated data before picking the maximum energy coefficient at each iteration of the MPFI loop, which results in the selection of true events instead of aliased events.

Even though priors can stabilize results at the higher frequencies, one of the demands for such an approach to be effective can be density, in that data are sufficiently dense for sampling across sources and receivers. Dense enough sampling helps to assure that a sufficiently non-aliased low-frequency region exists for building the stable priors. When this criterion is not met, the interpolation results tend to be sub-optimal, even if priors are used, since the resolution of priors decreases as sub-sampling increases. For example, consider a scenario involving ocean bottom node (OBN) acquisition where sources are placed at a dense grid and nodes are placed at a coarser grid. In such an example, interpolation along the shot direction may be feasible in practice and produce stable results; whereas, across the nodes, the approach can be impractical.

As explained, as an example, a method can include using the principle of reciprocity to derive usable priors from interpolated data across shots and use them to stabilize the reconstruction across nodes. Such an approach can improve performance of interpolation where standard MPFI results are sub-optimal. In such an approach, processing of seismic survey data is improved, which can improve quality of subsurface images, which can allow for improved identification of subsurface structures, material, etc. For example, through use of the principle of reciprocity for marine seismic data, identification of subsurface hydrocarbon(s) can be improved. Such an approach can improve ability to identify and/or location of identification.

Various techniques can interpolate seismic data in a manner that can exploit the sparse or low-rank structure of seismic data in some transform domain. While such techniques may produce adequate quality reconstruction results for irregular (or randomly) sub-sampled data, the quality of interpolation deteriorates substantially when sampling is regular (or periodic). With periodic subsampled data, aliasing events can exist on top of true events; thus, it can be difficult to distinguish between true and aliased events during the interpolation.

During interpolation, it can be quite probable that an interpolation framework will pick an aliased event resulting in sub-optimal quality. Thus, extra information can be demanded in the interpolation framework to guide it towards picking the true events and/or discarding the aliased events. To address such issues, priors were introduced in the data interpolation framework, where an amplitude spectrum derived from the alias free frequency band of small spatio-temporal windows may be used as weights to distinguish between the aliasing and the true events at the higher frequencies. Matching pursuit Fourier interpolation (MPFI) represents one such class of techniques where the incorporation of priors provides some benefit in seismic data reconstruing. Apart from building the priors from the non-aliased low-frequency component of the data itself, deriving priors from a separate, more densely sampled data set to interpolate dense-over/sparse-under marine surveys may be performed.

For ocean bottom nodes surveys, the priors derived from the non-aliased low-frequency spectrum of the common shot gathers can be quite low in resolution which means that they can be sub-optimal for use in distinguishing between aliased and true events at the higher frequencies. Thus, interpolation across nodes is sub-optimal.

As an example, to address such an issue, a method can utilize the principle of reciprocity. For example, consider a method that utilizes the principle of reciprocity to derive priors from a non-aliased interpolated frequency spectrum of a common receiver gather to stabilize reconstruction of a common shot gather, which thereby involves interpolation across nodes.

As an example, a common shot gather can be a seismic recording in the field where each shot is recorded sequentially. As an example, a common receiver gather can be a gathering of shots belonging to a receiver position in the field. As an example, a common receiver gather can be a display of seismic traces that share a receiver and/or a data structure that includes common receiver gather data. As an example, a common source gather (e.g., common shot gather) can be a display of seismic traces that share a source and/or a data structure that includes common source gather data. As an example, a gather can be a data structure and/or a display of seismic traces that share an acquisition parameter, such as a common midpoint gather, which contains traces having a common midpoint.

As an example, moveout can be the difference in the arrival times or traveltimes of a reflected wave measured by receivers at two different offset locations. As an example, normal moveout (NMO) can be moveout caused by the separation between a source and a receiver in the case of a flat reflector. Dip moveout (DMO) can occur as an effect in addition to NMO when reflectors dip. Various scenarios that demand static corrections can also produce moveout.

As an example, a static correction can involve so-called "statics", which can involve a bulk shift of a seismic trace in time during seismic processing. As an example, a common static correction can be a weathering correction, which compensates for a layer of low seismic velocity material near the surface of the Earth. As an example, one or more other corrections may compensate for differences in topography and differences in the elevations of sources and receivers.

As mentioned, a method can include using the principle of reciprocity to derive priors from the non-aliased interpolated frequency spectrum of common receiver gathers to stabilize reconstruction across nodes. As mentioned, spatial arrangements (e.g., 2D, 3D and/or 4D) can differ for sources and receivers in marine seismic surveys. For example, sources can be spatially dense in comparison to receivers.

As an example, a method can perform interpolation with priors using the matching pursuit Fourier interpolation (MPFI) (e.g., a simplest greedy pursuit algorithm, etc.), which can iteratively approximate an observed signal in terms of a linear combination of a set of waveforms.

Figure 6:
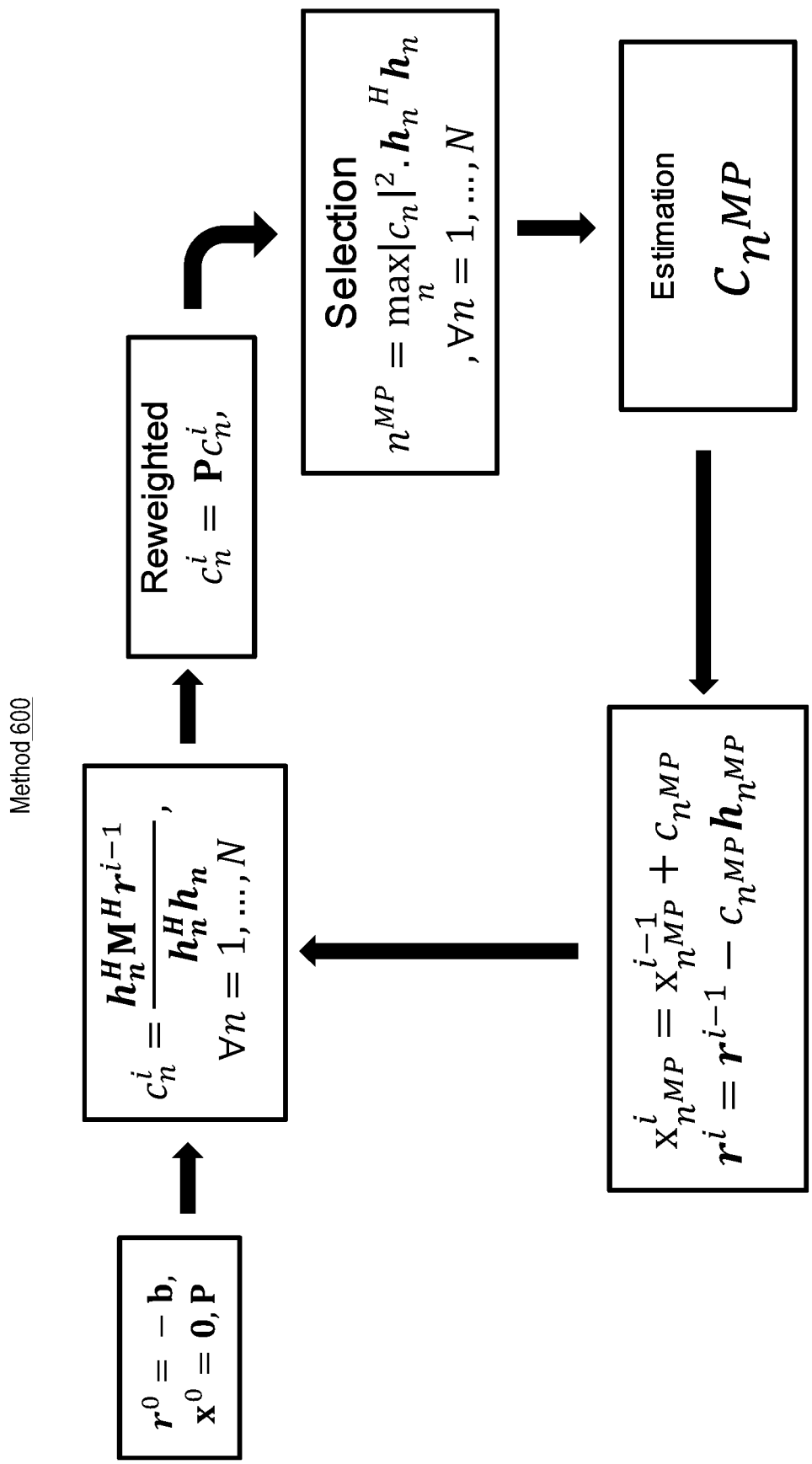
FIG. 6 illustrates an example of a method.

FIG. 6 shows an example of a method 600 that involves using the MPFI. The example algorithm, below, Algorithm 1, may be utilized.

---

Algorithm 1: Matching Pursuit Fourier Interpolation with Prior (MPFI)

Input: b, $\mathcal{D}$, P, M
$r^0 = -b$, $x^0 = 0$
repeat {MPFI iterations} iteration i 1. $c_n = \dfrac{h_n^H M^H r^{i-1}}{h_n^H h_n}$, $\forall\, n = 1, \ldots, N$ 2. $c_n = Pc_n$ 3. $n^{MP} = \max_n \zeta_{MP,n} = \max_n |c_n|^2 \cdot h_n^H h_n$, $\forall\, n = 1, \ldots, N$ 4. $x_n^{MP^i} = x_n^{MP^{i-1}} + c_n^{MP}$
5. $r^i = r^{i-1} - g_n^{MP} h_n^{MP}$ until convergence {MPFI iterations}
Output: $x^i$

--- where $(\bullet)^H$ is the conjugate transpose operator and $(\bullet)_n$ is the $n^{th}$ element (or column) of the vector (or matrix).

As shown, the method 600 of FIG. 6 shows a general outline of MPFI algorithm using priors. Such a method can solve the interpolation problem using three stages at each iteration where the three stages are: a reweighted stage, a selection stage, and an estimation stage.

As an example, let x=0 be the first estimate of the coefficient vector, and r°=−b represent the residual vector at iteration 0. In such an example, the first stage maps the current estimate of the interpolated signal into a transform domain, e.g., $c^i = (\mathcal{D} M)^H r^i$. The next stage can involve applying amplitudes weights to the coefficient vector to suppress and/or discard false aliased events. As an example, a method can select a single coefficient associated with maximum amplitude value, and an associated column from $\mathcal{D}$ that best matched the residual. Next, a method can update x at the estimation stage to decrease the residual vector. As an example, a method can repeat the above actions iteratively. In such an approach, the amplitude weights P can be in general derived from the non-aliased low-frequency component of the data itself.

Although priors can stabilize data reconstruction at high-frequency, the resolution of interpolation tends to be quite sensitive to the non-aliased low-frequency range of the spectrum.

In various instances, depending on coverage, resources, etc., a seismic survey may involve acquiring data that may be coarser in one or more regards. By acquiring coarser data, there can be relatively large gaps in sampling, such that the region over which building of priors is available tends to shrink. As the region shrinks, this can result in sub-optimal priors computation to de-alias the high-frequency spectrum of seismic data. For example, consider an acquisition scenario that can be sparse for ocean bottom node (OBN) acquisition where sources are fired at a dense grid(s), but nodes are placed at a sparse grid(s).

As mentioned, OBN acquisition can involve approximately 50 m sampling for sources and approximately 200 m to approximately 300 m spacing of nodes in an inline direction and in a crossline direction. Such values are given as examples with respect to a lateral extent (e.g., inline and crossline or x and y). As mentioned, differences in depth (e.g., z) can exist.

Where source arrangement is dense and receiver arrangement sparse, interpolation across sources tends to result in a better-constrained problem as compared to interpolating the nodes (e.g., receivers). To address complexity of reconstructing across nodes, as mentioned, a method can utilize the principle of reciprocity to derive priors P from interpolated shots and use them to interpolate nodes at a finer sampling grid. Such a method can improve the performance of interpolation where the standard MPFI results are sub-optimal.

As mentioned, according to the principle of reciprocity, the same seismogram can be expected to be recorded if the locations of the source and geophone are exchanged. Although the principle of reciprocity tends to be true for an individual source-receiver pair irrespective of where placed, the sources and receivers in a medium, for building the priors, the demands are that the common receiver and shot gather are to be quite similar to each other in terms of the moveout (dip) of the seismic events. Such a condition tends to be true when the sources and receivers are collocated in space, which tends not to hold true for OBN surveys as sources and receivers may be placed at different depth levels. Hence the seismic events in both receiver gather and shot gather can exhibit different moveout; noting that the principle of reciprocity tends to remain valid for an individual pair of source and receiver in the OBN survey even if they are placed at different depth levels.

As explained, a method can include one or more adjustment actions that can be applied to interpolated common receiver gathers where a first one can be to correct for the water velocity correction that accounts for changes in sea conditions over time, and a second one can be to use the constant water velocity re-datuming approach to map sources and receiver to same datum level. Such example adjustments can help to assure that the principle of reciprocity can be utilized to build appropriate priors from a common receiver gather to stabilize interpolation of common shot gathers.

Figure 7:
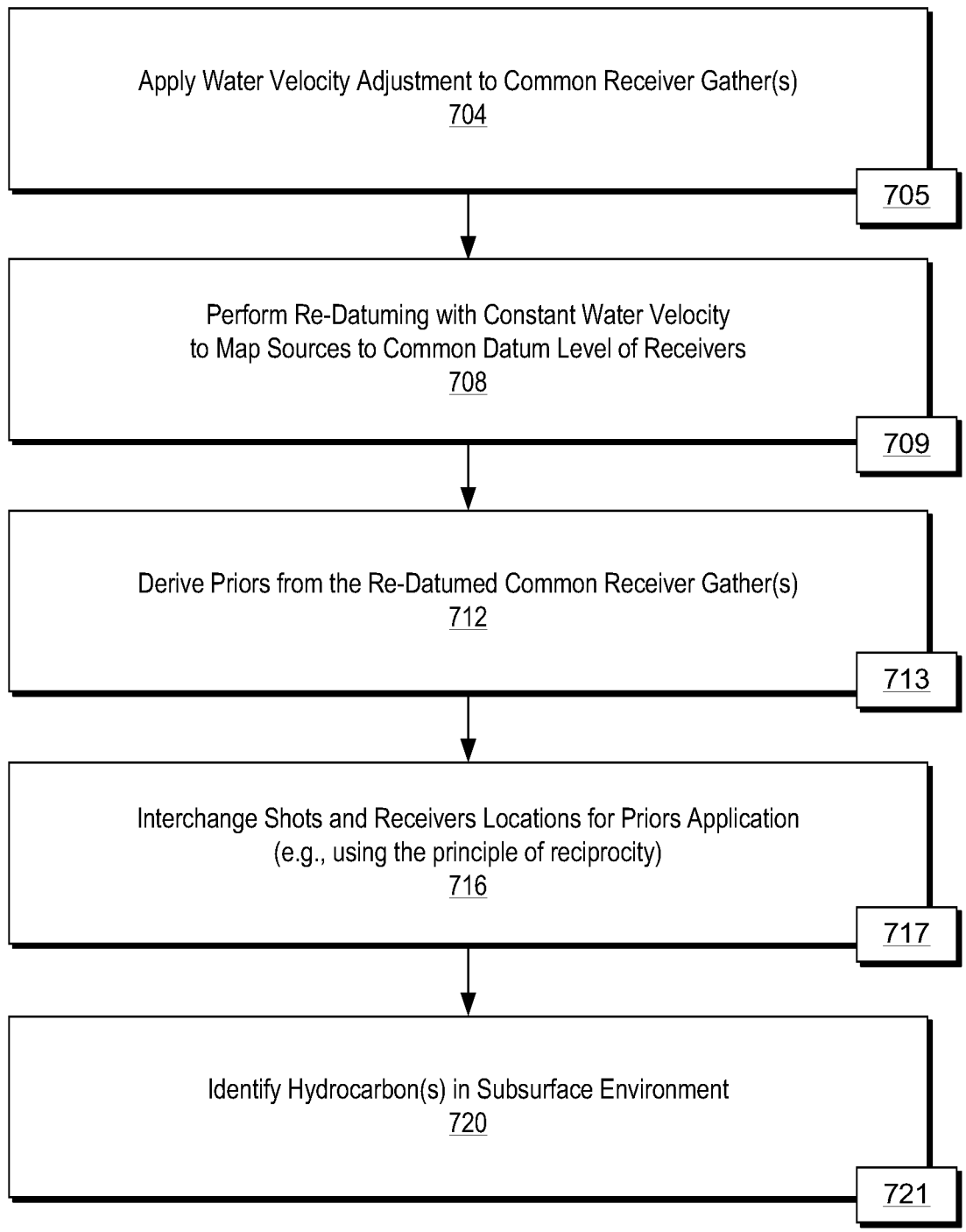
FIG. 7 illustrates an example of a method.

FIG. 7 shows an example of a method 700 that includes an application block 704 for applying water velocity adjustment to one or more common receiver gathers, a performance block 708 for performing a re-datuming with constant water velocity to map sources to common datum level of receivers, a derivation block 712 for deriving priors from the re-datumed common receiver gather(s), an interchange block 716 for interchanging shots and receiver locations for priors application (e.g., using the principle of reciprocity), and an identification block 720 for identifying one or more hydrocarbons in a subsurface environment surveyed. The method 700, as shown, involves various actions that can be pre-processing actions on a common receiver gather before computing priors to interpolate one or more common shot gathers.

The method 700 is shown in FIG. 7 in association with various computer-readable media (CRM) blocks 705, 709, 713, 717 and 721. Such blocks generally include instructions suitable for execution by one or more processors (or cores) to instruct a computing device or system to perform one or more actions. While various blocks are shown, a single medium may be configured with instructions to allow for, at least in part, performance of various actions of the method 700. A computer-readable medium (CRM) may be a computer-readable storage medium that is not a carrier wave, that is not a signal and that is non-transitory. The blocks may be provided as instructions such as the instructions 380 of the system 360 of FIG. 3.

Figure 8:
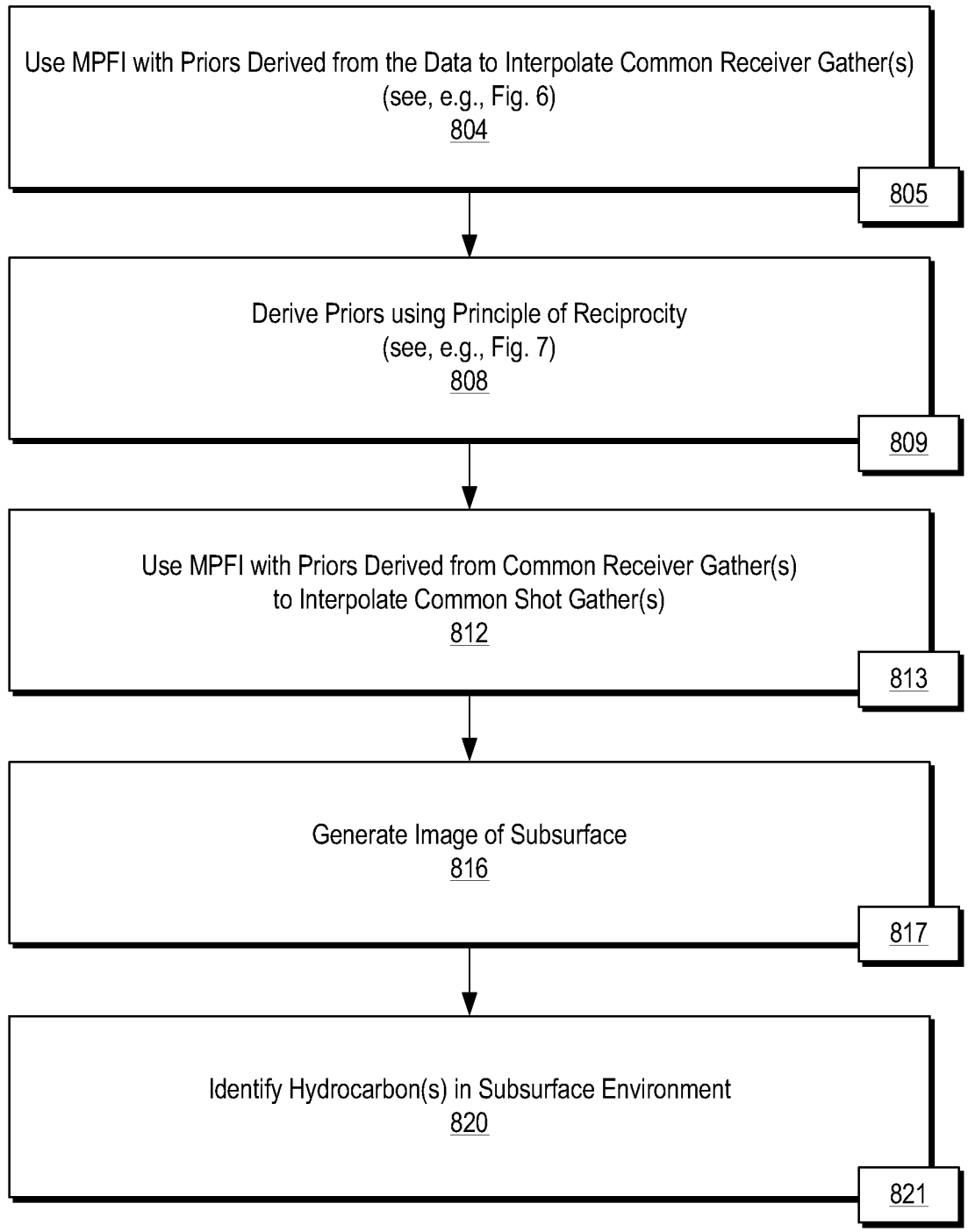
FIG. 8 illustrates an example of a method.

FIG. 8 shows an example of a method 800 that includes a use block 804 for using the MPFI with priors derived from the data to interpolate one or more common receiver gathers (see, e.g., FIG. 6), a derivation block 808 for deriving priors using the principle of reciprocity (see, e.g., FIG. 7), a use block 812 for using the MPFI with priors derived from common receiver gather(s) to interpolate common shot gather(s), a generation block 816 for generating an image of a subsurface environment (e.g., as surveyed), and an identification block 820 for identifying one or more hydrocarbons in the subsurface environment. For example, the image can be improved such that one or more techniques can be applied to improve hydrocarbon identification. The method 800 can be part of a seismic survey workflow that includes acquiring seismic data and processing the seismic data to generate an image, etc. As an example, a system can be a seismic survey imaging system that can include various types of equipment that can be distributed to provide for surveying a relatively large subsurface region of the Earth. As mentioned, nodes may be placed on an ocean bottom (e.g., OBNs) where the nodes acquire seismic data that travels through portions of the Earth. In such an example, structures, materials, etc., can be reconstructed as information pertaining to such structures, materials, etc., is included in the seismic data acquired by the nodes. While a magnetic resonance imaging system may fit neatly into a wing of a hospital, the same cannot be said for a seismic survey imaging system due to the subsurface environment to be "imaged" being many, many times larger than a human (e.g., consider a human of 2 meters in height and 0.5 meter in diameter versus a subsurface environment that is hundreds of meters in lateral span and depth).

The method 800 is shown in FIG. 8 in association with various computer-readable media (CRM) blocks 805, 809, 813, 817 and 821. Such blocks generally include instructions suitable for execution by one or more processors (or cores) to instruct a computing device or system to perform one or more actions. While various blocks are shown, a single medium may be configured with instructions to allow for, at least in part, performance of various actions of the method 800. A computer-readable medium (CRM) may be a computer-readable storage medium that is not a carrier wave, that is not a signal and that is non-transitory. The blocks may be provided as instructions such as the instructions 380 of the system 360 of FIG. 3.

As an example, a framework can provide for performing various actions that can provide for reconstructing common shot gathers. For example, consider interpolating common receiver gathers using MPFI where priors are derived from the non-aliased low-frequency part of the data itself; applying water velocity variation correction followed by constant water velocity based re-datuming to map sources to the receiver depth; deriving priors from the wider range of non-aliased frequency spectrum of the interpolated shots;

and using reciprocity, incorporating priors derived to perform interpolation across nodes (e.g., using equation 2, above).

As an example, a method can include computing priors using sources that span a much wider range of a non-aliased part of a frequency-wavenumber spectrum. In such an example, a method can improve resolution of priors that can be utilized to de-alias seismic events across nodes.

Figure 9:
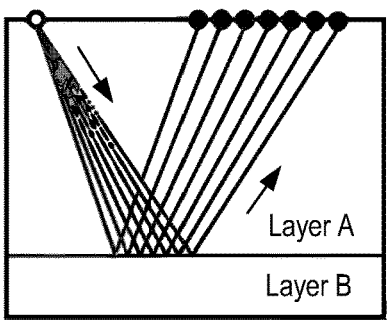
FIG. 9 illustrates examples of surveys and data.
Figure 9:
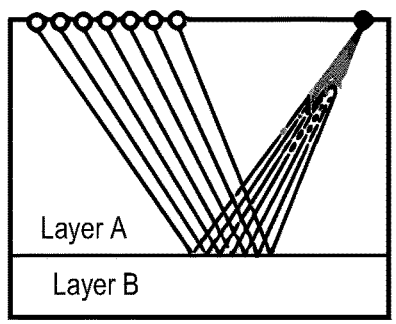
Figure 9:
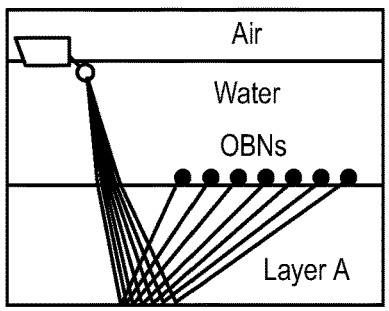
Figure 9:
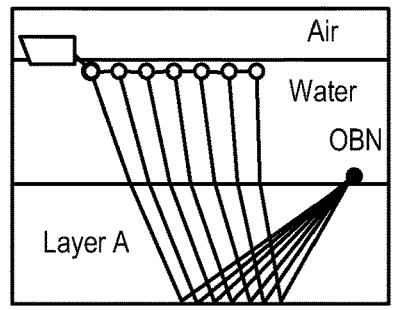
Figure 9:
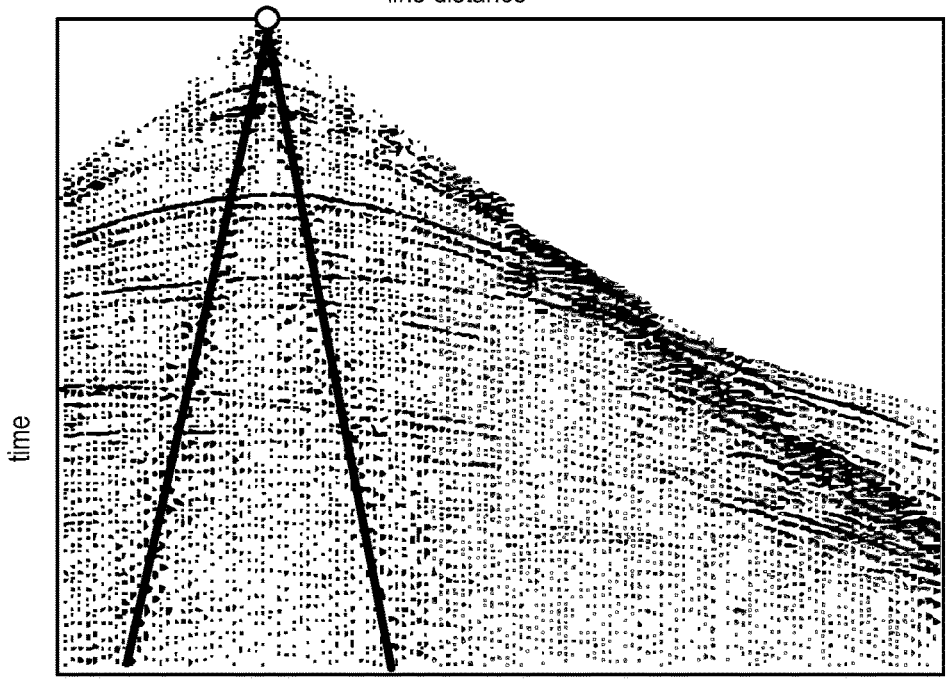

FIG. 9 shows example survey arrangements of equipment for land based surveys 910 and 920 and marine based surveys 930 and 940 along with an example of a shot gather 950. As shown, a common shot approach may be utilized (see surveys 910 and 930) and/or a common receiver approach may be utilized (see surveys 930 and 940). In the marine surveys 930 and 940, a vessel can tow one or more sources at or below an air/water interface where ocean bottom nodes (OBNs) can be positioned on a water/formation interface (e.g., a seafloor or seabottom, etc.). In the marine surveys 930 and 940, the energy of the source or the sources passes through the water and then into the formation as indicated by layer A where another layer (e.g., layer B) is not shown but forms an interface (e.g., a reflector) with layer A. As shown, energy can reflect off the interface and progress upwardly to the one or more OBNs, which can be receivers that record the energy.

As explained, when seismic traces of a gather come from a single shot and many receivers, it is called a common shot gather (see surveys 910 and 930); whereas, a single receiver with many shots is called a common receiver gather (see surveys 920 and 940).

The shot gather 950 is a plot of traces with respect to line distance (e.g., an inline or a crossline series of receivers) with respect to time. As shown, with highlighting by two thick lines, the energy appears as a cone intersected by surfaces.

Figure 10:
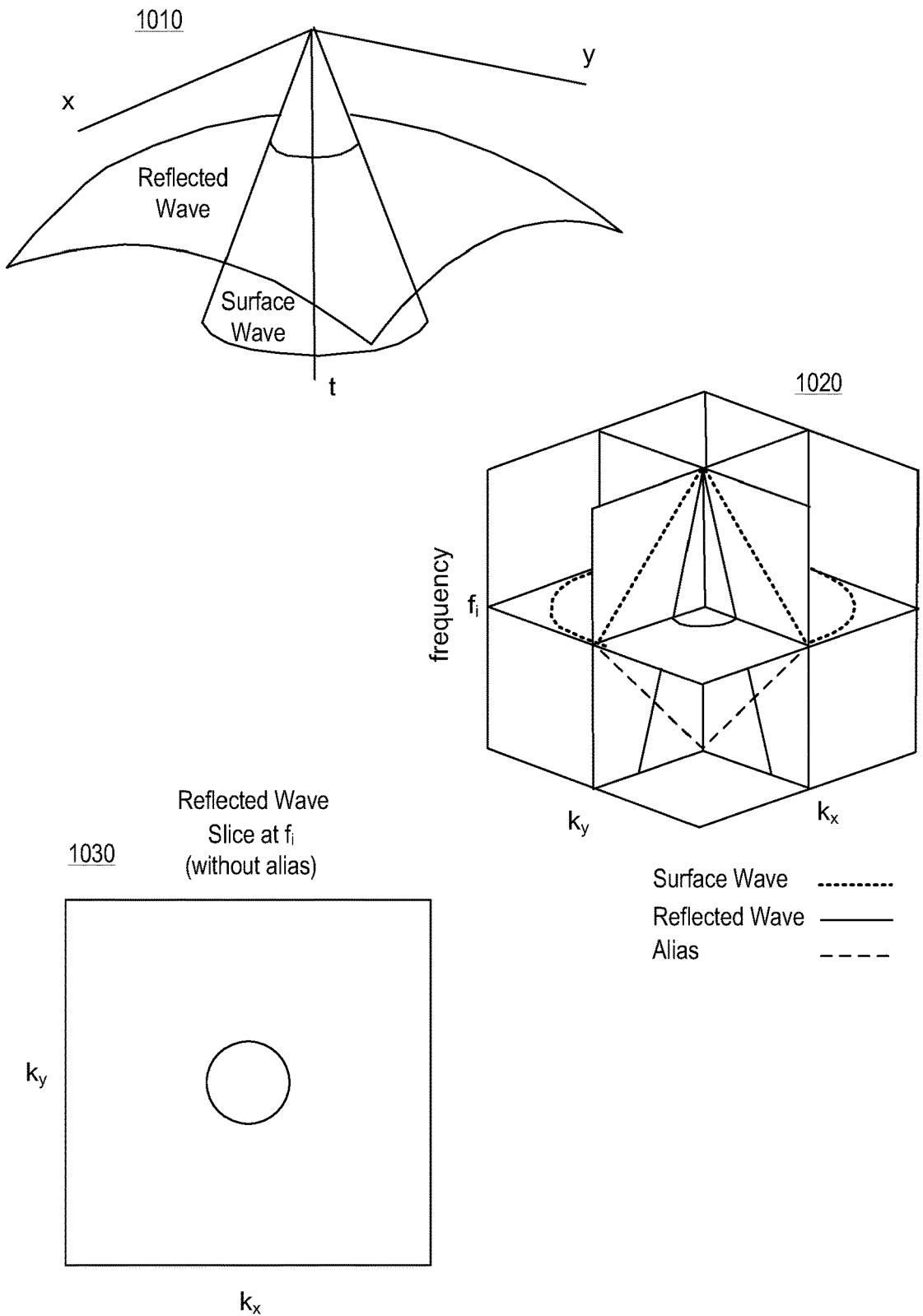
FIG. 10 illustrates examples of domains and data.

FIG. 10 shows example plots 1010, 1020 and 1030 of various domains, which can be utilized to illustrate aliasing. As an example, a method can include converting seismic data from a time-displacement domain (e.g., distance, etc.) to a frequency and wavenumber domain. In the frequency and wavenumber domain, one or more of various techniques may be applied such as, for example, F-k filtering, which may aim to remove unwanted frequencies (e.g., frequencies higher and/or lower than those of a desirable seismic signal band). In various instances, filtered data may be converted back to a time-displacement domain. Where frequencies are involved, sampling and/or density of data can impact results. For example, consider the Nyquist criterion.

In reflection seismology, a source may be utilized to propagate a broadband impulse into a subsurface region and measure a reflected wavetrain that returns from one or more boundaries (e.g., reflectors). In such an imaging process, the reflected wavetrain (e.g., reflected waveforms) are to be adequately sampled, which involves sampling rate (e.g., samples per unit time). For example, if a wave is a sine wave with a cycle length defined by a time, then the Nyquist criterion may be utilized to determine the sampling rate that can capture the sine wave via the samples with a reduced risk of aliasing. Sampling can be a process of capturing discrete data points from a continuous analog signal, where the discrete data points can be in digital form. If sampling is oversampled by using too high a sample rate, the survey may acquire an excessive amount of data; whereas, if sampling is undersampled by using too low a sample rate, the recorded data can suffer from aliasing.

Aliasing is a phenomenon observed when the sample interval is not sufficiently short to capture the higher range of frequencies in a signal. To reduce risk of aliasing, each constituent frequency can be sampled at least two times per wavelength. The Nyquist frequency can be defined as a criterion for sampling where the Nyquist frequency is half of the sampling frequency of a digital recording system. The Nyquist frequency can be selected to be higher than the frequencies in an observed signal to allow for reconstruction of the signal from the samples.

Above the Nyquist frequency, the signal frequencies are not sampled twice per wavelength, and therefore can experience a folding about the Nyquist frequency to low frequencies. In other words, by higher frequencies not captured can impact those that are captured by being present as aliasing artefacts (e.g., spreading of energy that is not adequately sampled, etc.).

Aliased surface waves can be a result of large-space sampling intervals in 3D seismic surveying. F-k filtering may not be effective in reducing spatial aliasing of surface waves and, an F-k filter that covers too wide of a range can remove too great an amount of information and make interpretation difficult. F-k filtering may be applied for reducing aliasing of surface-wave energy and maintaining the low frequency information of the reflected waves, and attenuating residual weak energy of ground roll. F-k filtering may be applied to reduce coherent noise in seismic data.

As an example, for a 2D seismic survey, most of the reflection energy may be expected to be incident in, or near the in-line plane, whereas most of the energy incident in the cross-line direction may be scattered ground-roll and/or other types of noise. In such an example, a passband of a 2D x-y filter may have elliptical contours, for example, with greater attenuation in the cross-line direction where a larger passband in the in-line direction can help to preserve signal components with maximum wavenumber and frequency content. The foregoing description of an F-k type of filter provides for understanding how or why energy (e.g., signals) appears as it may in various domains.

In the plot 1010, an x,y-domain is illustrated with respect to time to show a surface wave and a reflected wave. In the plot 1020, a frequency and wavenumber domain is illustrated, which includes an example of an alias. In the plot 1030, a slice at frequency $f_i$ is taken from the plot 1020, which shows a circular region of energy such as reflected wave energy with respect to wavenumber $k_x$ and $k_y$. As an example, further processing can be performed, for example, as to phase of the surface and reflected waves via phase-shift processing in the F-k domain. As mentioned, the diagrams and plots of FIGS. 9 and 10 provide for illustrating common shot and common receiver surveys and various domains, which can show various types of energy as circular features in a wavenumber domain.

Figure 11:
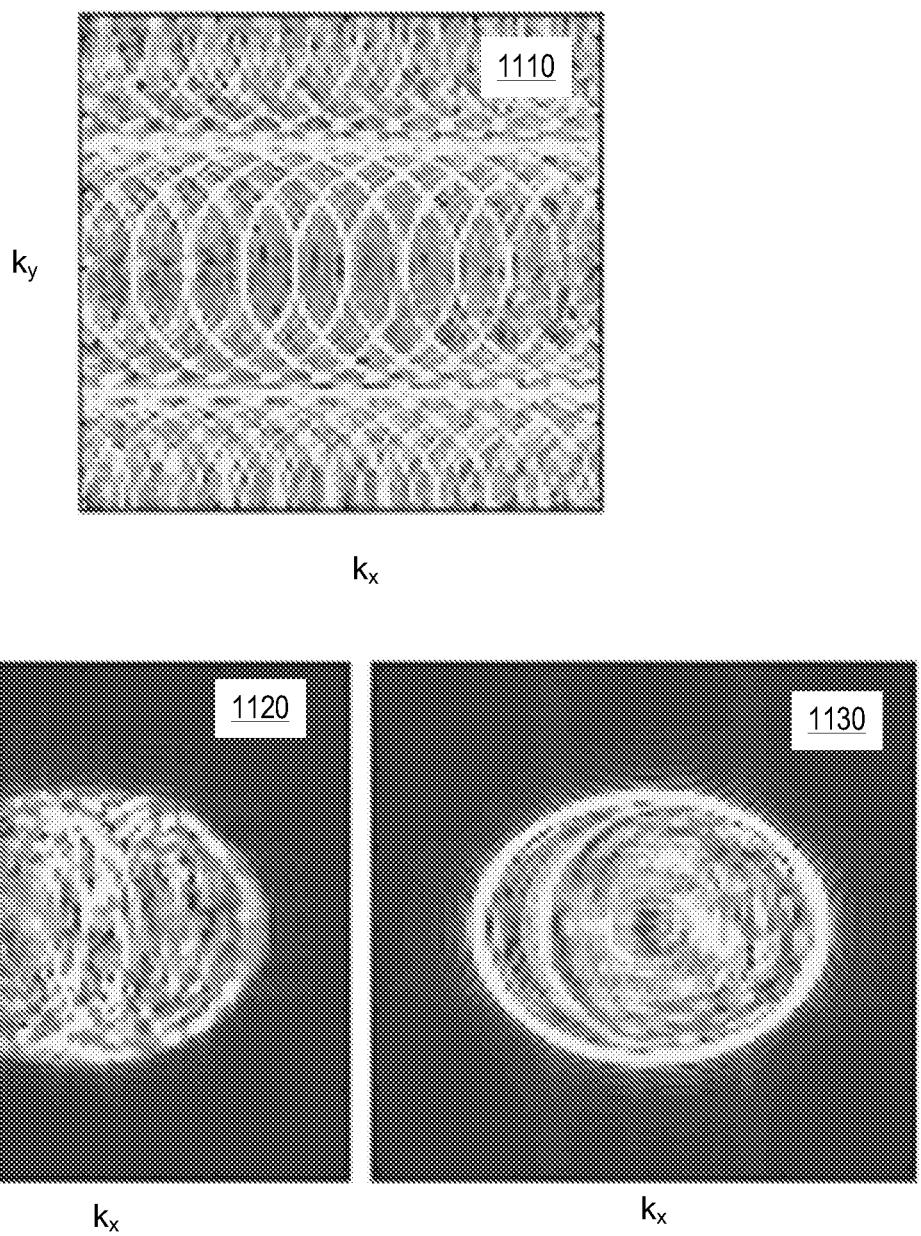
FIG. 11 illustrates examples of images.

FIG. 11 shows various example images 1110, 1120 and 1130 of energy that is received from a reflection seismology survey of a geologic region of the Earth. The images illustrate the effect of good and bad priors on identifying aliased and true events. The image 1110 shows the wavenumber spectrum in x and y directions (e.g., $k_x$ and $k_y$) of a single frequency slice at 20 Hz (e.g., a Fourier-wavenumber spectrum of the input common shot gather) while the images 1120 and 1130 show how processing of the data in the image 1110 impacts results where the image 1120 is based on the low-frequency spectrum of the data itself and where the image 1130 is based on the frequency-wavenumber spectrum of the interpolated common receiver gathers. As explained various features may appear circular, where aliasing, as may be due to sampling and/or survey equipment density, may result in energy or image artefacts.

As shown in the image 1130 of FIG. 11, the priors derived from reciprocal receiver gathers can effectively remove various aliased events; whereas, as shown in the image 1120, priors derived from the low-frequency component of the shot gather itself cannot achieve the same quality. Accordingly, use of the principle of reciprocity can improve anti-aliasing. Such anti-aliasing acts to improve handling of "true" events. True events can be reflections for physical structures in a geologic region of the Earth. Where true events can be more readily identified, reflection seismology can more accurately image the geologic region, which can provide a basis for one or more additional actions (e.g., model building, further surveying, drilling, injection of fluid, production of fluid, etc.). As an example, a method can improve a hydrocarbon identification workflow where hydrocarbon region can be more readily identified using reflection seismology.

As an example, one or more workflows can utilize priors derived using the principle of reciprocity to perform interpolation across nodes as in an OBN survey.

As explained reflection seismology can be performed by positioning equipment in the field, which may be utilized to define an acquisition geometry (e.g., an acquisition footprint, etc.) that includes sources and receivers. In such an example, some amount of reciprocity may exist such that a reciprocal approach may be implemented to improve image quality. A reciprocal approach can utilize data acquired from one point of view to improve processing of data acquired from another point of view, where there can be some amount of reciprocity between the points of view. As explained, an acquisition geometry can be specified using a density or densities. In various instances, densities can differ in a multidimensional space. As an example, density differences may exist for sources, receivers, etc., which may themselves differ, for example, as to inline and/or crossline directions. As explained, differences can exist for sampling such as sampling rates. As an example, a reciprocal approach may be utilized where differences exist in one or more of density and sampling (e.g., sampling rate). As explained, a reciprocal approach (e.g., reciprocity) may be utilized in a workflow involving multi-dimensional deconvolution (MDD).

As an example, MDD can be viewed as a relatively robust framework to retrieve the Green's function of the subsurface at a datum of interest where it may overcomes various factors of 1D up-down deconvolution such as variation in water velocity, changes in the overburden, etc. Such an approach can first cross-correlate the directionality decomposed up- and down-going wavefields with the down-going wavefields followed by deconvolving the smearing effects of virtual sources in time and space domain using the point-spread function (PSF). As explained, the output of MDD (e.g., estimated Green's function of the subsurface) is sampled at the location of the receiver, which can be problematic where data are acquired using a relatively coarse receiver sampling in the field, as may occur with an OBN survey (e.g., due to density and/or sampling rate), where the estimated Green's function can be highly aliased as the deconvolution is performed over aliased data. To address such aliasing, as an example, a method can include interpolation across nodes before proceeding to a MDD framework workflow. As explained, a reciprocity based approach can provide for interpolation across nodes, which, in turn, can reduce one or more aliasing related issues.

As an example, a reciprocity approach may be utilized in time-lapse OBN surveys where a densely sampled monitor survey can be used to derive priors for the interpolation of a legacy base survey or vice-a-versa. In such an example, the priors may be derived from either from the monitor data itself or from the other legacy survey, where the principle of reciprocity can be applied to map sources/receivers at the same datum level before performing an interpolation.

As an example, a reciprocity approach may be utilized for towed-streamer coil acquisition. For example, the principle of reciprocity can be utilized to stabilize priors to perform interpolation in shots/receiver's direction. In performing a 5D interpolation, using source-x, source-y, receiver-x, receiver-y as the interpolation coordinates, a method can include using data from a dense sampling direction to derive priors for a sparse sampling direction (e.g., in both inline and crossline directions).

As an example, a method can include processing data utilizing one or more frequencies, frequency bands, etc. For example, an approach may include stepping down and/or stepping up in frequency. As an example, in such an approach, one or more stability limits may be determined, which may be utilized for optimizing a reciprocal process. For example, consider determining one or more frequency limits, where an upper frequency limit may be determined (e.g., beyond which an approach may not be expected to provide additional improvements, etc.).

As an example, a method can include applying reciprocity in a deghosting workflow. For example, consider a streamer acquisition where a towed streamer where data are relatively finely sampled in a common shot domain such that data in the common shot domain can be applied in a common receiver domain for purposes of deghosting. In various instances, a marine survey that utilizes streamers can have coarser sampling in the common receiver domain. In such instances, the principle of reciprocity can be applied using data in the common shot domain.

As an example, a reciprocity approach may be applied where one domain may have a coarser sampling than another domain (e.g., shot versus receiver or receiver versus shot). In such an example, aliasing may be reduced (e.g., anti-aliasing).

As explained, various methods can improve interpolation solvers in performing reconstruction across a coarser node arrangement in an OBN survey. As mentioned, an example of a solver is the matching pursuit Fourier interpolation (MPFI). As MPFI can derive stable priors from the non-aliased low-frequency spectrum of the data itself, for OBN survey, this region tends to be below approximately 2 Hz to approximately 3 Hz when performing the interpolation across nodes, thus derivation of optimal priors for interpolation across nodes tends to be impractical as the resolution of priors will be very small.

As explained, MPFI can be improved through use of the principle of reciprocity to derive stable priors from a common receiver gather to interpolate a common shot gather. As explained, a method can include various actions that can aim to assure that both the common source and receiver gather are similar in nature by performing re-datuming, followed by using the principle of reciprocity to interchange source location and receiver location to estimate stable priors to perform reconstruction across nodes.

As explained, various methods may be utilized in OBN surveys (e.g., in the oil and gas industry, etc.). As mentioned, various methods may be utilized in time-lapse survey monitoring, for example, where nodes are placed at denser grid compared to the exploration surveys.

As an example, an interpolation framework, as a computational framework, can be improved. As mentioned, a standard framework may not provide optimal reconstruction results across nodes as a technique can demand stable priors to differentiate between aliased and true energy at higher frequencies. Again, as nodes may be sampled coarsely, it tends to be impractical to use the non-aliased low-frequency spectrum of the common shot gather to perform reconstruction across nodes. As an example, an interpolation framework can be improved where priors are derived using the principle of reciprocity to perform interpolation across nodes.

Figure 12:
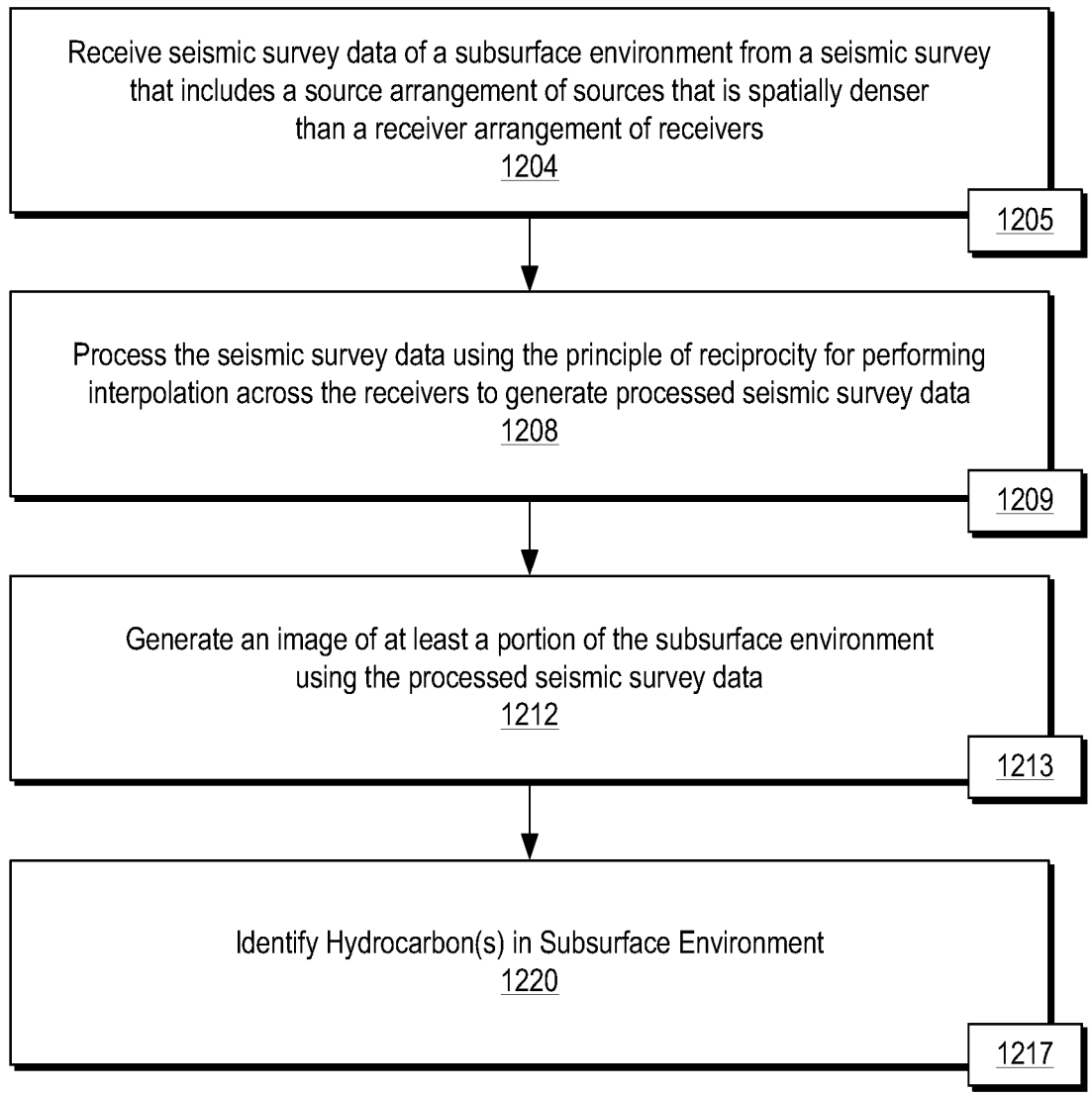
FIG. 12 illustrates an example of a method.

FIG. 12 shows an example of a method 1200 that includes a reception block 1204 for receiving seismic survey data of a subsurface environment from a seismic survey that includes a source arrangement of sources that is spatially denser than a receiver arrangement of receivers; a process block 1208 for processing the seismic survey data using the principle of reciprocity for performing interpolation across the receivers to generate processed seismic survey data; and a generation block 1212 for generating an image of at least a portion of the subsurface environment using the processed seismic survey data. As shown, the method 1200 can include, for example, an identification block 1220 for identifying one or more hydrocarbons in the subsurface environment.

The method 1200 is shown in FIG. 12 in association with various computer-readable media (CRM) blocks 1205, 1209, 1213 and 1217. Such blocks generally include instructions suitable for execution by one or more processors (or cores) to instruct a computing device or system to perform one or more actions. While various blocks are shown, a single medium may be configured with instructions to allow for, at least in part, performance of various actions of the method 1200. A computer-readable medium (CRM) may be a computer-readable storage medium that is not a carrier wave, that is not a signal and that is non-transitory. The blocks may be provided as instructions such as the instructions 380 of the system 360 of FIG. 3.

Figure 13:
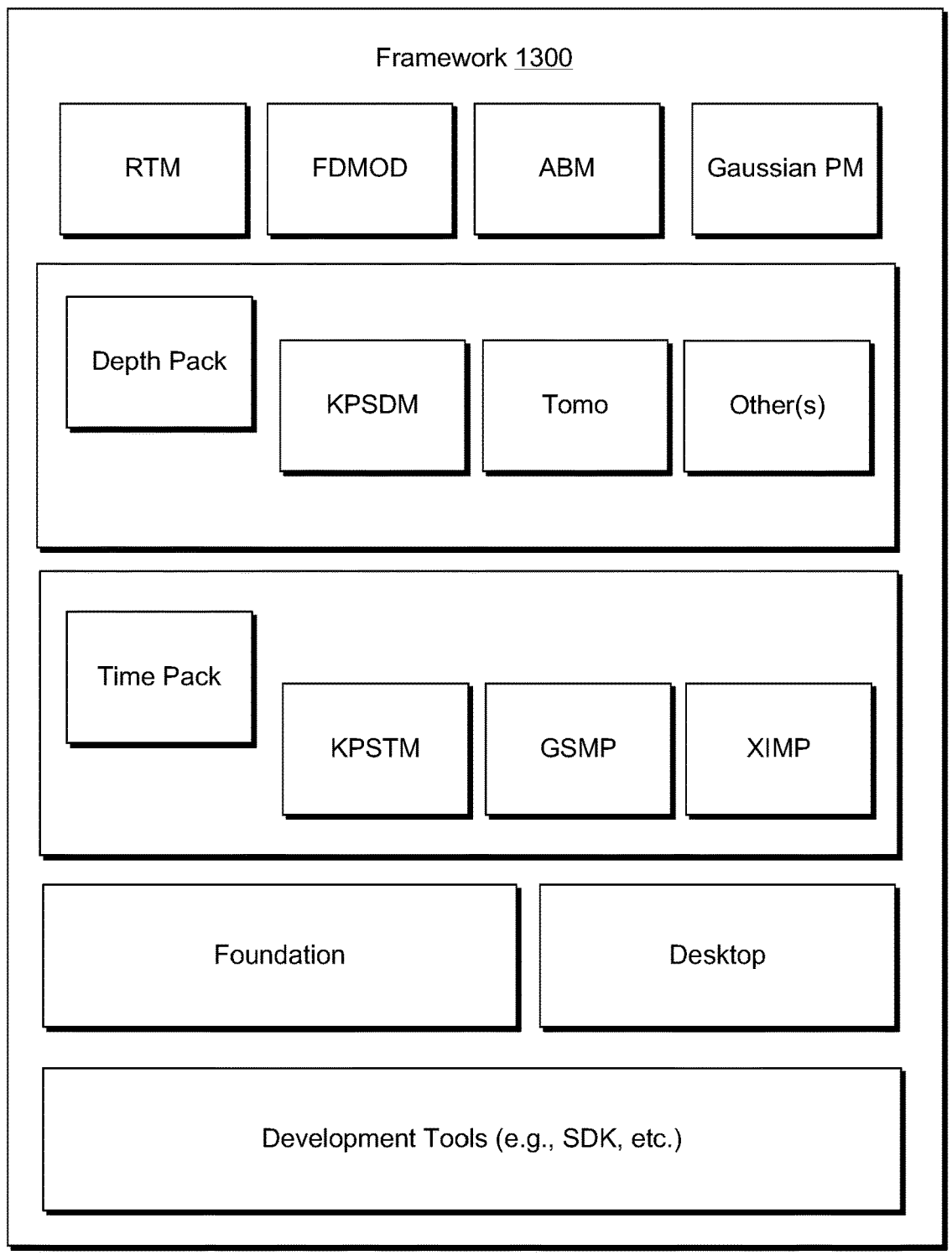
FIG. 13 illustrates an example of a computational framework.

FIG. 13 shows an example of a computational framework 1300 that can include one or more processors and memory, as well as, for example, one or more interfaces. The blocks of the computational framework 1300 may be provided as instructions such as the instructions 380 of the system 360 of FIG. 3. The computational framework of FIG. 13 can include one or more features of the OMEGA framework (Schlumberger Limited, Houston, Texas), which includes finite difference modelling (FDMOD) features for two-way wavefield extrapolation modelling, generating synthetic shot gathers with and without multiples. The FDMOD features can generate synthetic shot gathers by using full 3D, two-way wavefield extrapolation modelling, which can utilize wavefield extrapolation logic matches that are used by reverse-time migration (RTM). A model may be specified on a dense 3D grid as velocity and optionally as anisotropy, dip, and variable density.

As shown in FIG. 13, the computational framework 1300 includes features for RTM, FDMOD, adaptive beam migration (ABM), Gaussian packet migration (Gaussian PM), depth processing (e.g., Kirchhoff prestack depth migration (KPSDM), tomography (Tomo)), time processing (e.g., Kirchhoff prestack time migration (KPSTM), general surface multiple prediction (GSMP), extended interbed multiple prediction (XIMP)), framework foundation features, desktop features (e.g., GUIs, etc.), and development tools.

The framework 1300 can include features for geophysics data processing. The framework 1300 can allow for processing various types of data such as, for example, one or more of: land, marine, and transition zone data; time and depth data; 2D, 3D, and 4D surveys; isotropic and anisotropic (TTI and VTI) velocity fields; and multicomponent data.

The framework 1300 can allow for transforming seismic, electromagnetic, microseismic, and/or vertical seismic profile (VSP) data into actionable information, for example, to perform one or more actions in the field for purposes of resource production, etc. The framework 1300 can extend workflows into reservoir characterization and earth modelling. For example, the framework 1300 can extend geophysics data processing into reservoir modelling by integrating with the PETREL framework via the Earth Model Building (EMB) tools, which enable a variety of depth imaging workflows, including model building, editing and updating, depth-tomography QC, residual moveout analysis, and volumetric common-image-point (CIP) pick QC. Such functionalities, in conjunction with the framework's depth tomography and migration algorithms, can produce accurate and precise images of the subsurface. The framework 1300 may provide support for field to final imaging, to prestack seismic interpretation and quantitative interpretation, from exploration to development.

As an example, the FDMOD component can be instantiated via one or more CPUs and/or one or more GPUs for one or more purposes. For example, consider utilizing the FDMOD for generating synthetic shot gathers by using full 3D, two-way wavefield extrapolation modelling, the same wavefield extrapolation logic matches that are used by reverse-time migration (RTM). FDMOD can model various aspects and effects of wave propagation. The output from FDMOD can be or include synthetic shot gathers including direct arrivals, primaries, surface multiples, and interbed multiples. The model can be specified on a dense 3D grid as velocity and optionally as anisotropy, dip, and variable density. As an example, survey designs can be modelled to ensure quality of a seismic survey, which may account for structural complexity of the model. Such an approach can enable evaluation of how well a target zone will be illuminated. Such an approach may be part of a quality control process (e.g., task) as part of a seismic workflow. As an example, a FDMOD approach may be specified as to size, which may be model size (e.g., a grid cell model size). Such a parameter can be utilized in determining resources to be allocated to perform a FDMOD related processing task. For example, a relationship between model size and CPUs, GPUs, etc., may be established for purposes of generating results in a desired amount of time, which may be part of a plan (e.g., a schedule) for a seismic interpretation workflow.

As an example, as survey data become available, interpretation tasks may be performed for building, adjusting, etc., one or more models of a geologic environment. For example, consider a vessel that transmits a portion of acquired data while at sea and that transmits a portion of acquired data while in port, which may include physically offloading one or more storage devices and transporting such one or more storage devices to an onshore site that includes equipment operatively coupled to one or more networks (e.g., cable, etc.). As data are available, options exist for tasks to be performed.

As an example, the framework 1300 can include one or more sets of instructions executable to perform one or more methods such as, for example, one or more of the methods of FIG. 6, FIG. 7, FIG. 8, FIG. 9, FIG. 10, FIG. 11, FIG. 12, etc.

As an example, a method can include analyzing a seismic survey as to arrangements of sources and/or receivers with respect to an ability to de-alias data acquired by a seismic survey performed using such arrangements. In such an example, the seismic survey may be optimized such that resources, time, etc., utilized to acquire the seismic survey are optimized where seismic survey data can be acceptably de-aliased to generate one or more images, identify one or more structures, materials, etc. As mentioned, seismic survey data can be utilized for model building such that a structural model of a subsurface environment can be built for purposes of planning, drilling, completing one or more wells, producing, injecting, fracturing, etc.

A system may include one or more modules, which may be provided to analyze data, control a process, perform a task, perform a workstep, perform a workflow, etc.

As an example, a method can include receiving seismic survey data of a subsurface environment from a seismic survey that includes a source arrangement of sources that is spatially denser than a receiver arrangement of receivers; processing the seismic survey data using the principle of reciprocity for performing interpolation across the receivers to generate processed seismic survey data; and generating an image of at least a portion of the subsurface environment using the processed seismic survey data. In such an example, the method can include identifying a hydrocarbon in the subsurface environment (e.g. presence thereof, location thereof, movement thereof, etc.).

As an example, a seismic survey can be or include a marine seismic survey.

As an example, receivers can be or include nodes. For example, consider ocean bottom nodes.

As an example, a method can include processing that includes performing at least one adjustment based on receiver depth, source depth or receiver depth and source depth.

As an example, a method can include processing that includes deriving stable priors from a common receiver gather of the seismic survey data to interpolate a common shot gather of the seismic survey data. For example, consider utilizing matching pursuit Fourier interpolation (MPFI).

As an example, a method can include processing that reduces aliasing artifacts.

As an example, a method can include receiving seismic survey data that includes aliasing artifacts and seismic events. In such an example, the aliasing artifacts can be aliased seismic events where the seismic events can be represented as non-aliased seismic events in the seismic survey data. As an example, processed seismic survey data can include fewer aliasing artifacts.

As an example, a method can include processing that includes using the principle of reciprocity for deriving usable priors from interpolation across sources and utilizing the usable priors for stabilizing reconstruction across receivers.

As an example, a method can include processing that includes using the principle of reciprocity for deriving priors from a non-aliased interpolated frequency spectrum of a common receiver gather to stabilize reconstruction of a common shot gather. In such an example, the processing can include interpolating across receivers using the derived priors.

As an example, a method can include processing that includes adjusting for a water velocity correction that accounts for changes in sea conditions over time and/or using constant water velocity re-datuming to map sources and receivers to a common datum level.

As an example, a method can include processing that includes computing priors using sources to span a wider range of a non-aliased part of a frequency-wavenumber spectrum to improve resolution of priors to de-alias seismic events across receivers.

As an example, a system can include a processor; memory operatively coupled to the processor; and processor-executable instructions stored in the memory to instruct the system to: receive seismic survey data of a subsurface environment from a seismic survey that includes a source arrangement of sources that is spatially denser than a receiver arrangement of receivers; process the seismic survey data using the principle of reciprocity to perform interpolation across the receivers to generate processed seismic survey data; and generate an image of at least a portion of the subsurface environment using the processed seismic survey data.

As an example, one or more computer-readable storage media can include computer-executable instructions executable to instruct a computing system to: receive seismic survey data of a subsurface environment from a seismic survey that includes a source arrangement of sources that is spatially denser than a receiver arrangement of receivers; process the seismic survey data using the principle of reciprocity to perform interpolation across the receivers to generate processed seismic survey data; and generate an image of at least a portion of the subsurface environment using the processed seismic survey data.

As an example, a computer program product can include instructions that are executable to cause a computer, a computing system, etc., to perform one or more methods (e.g., including a reciprocity approach, etc.).

Figure 14:
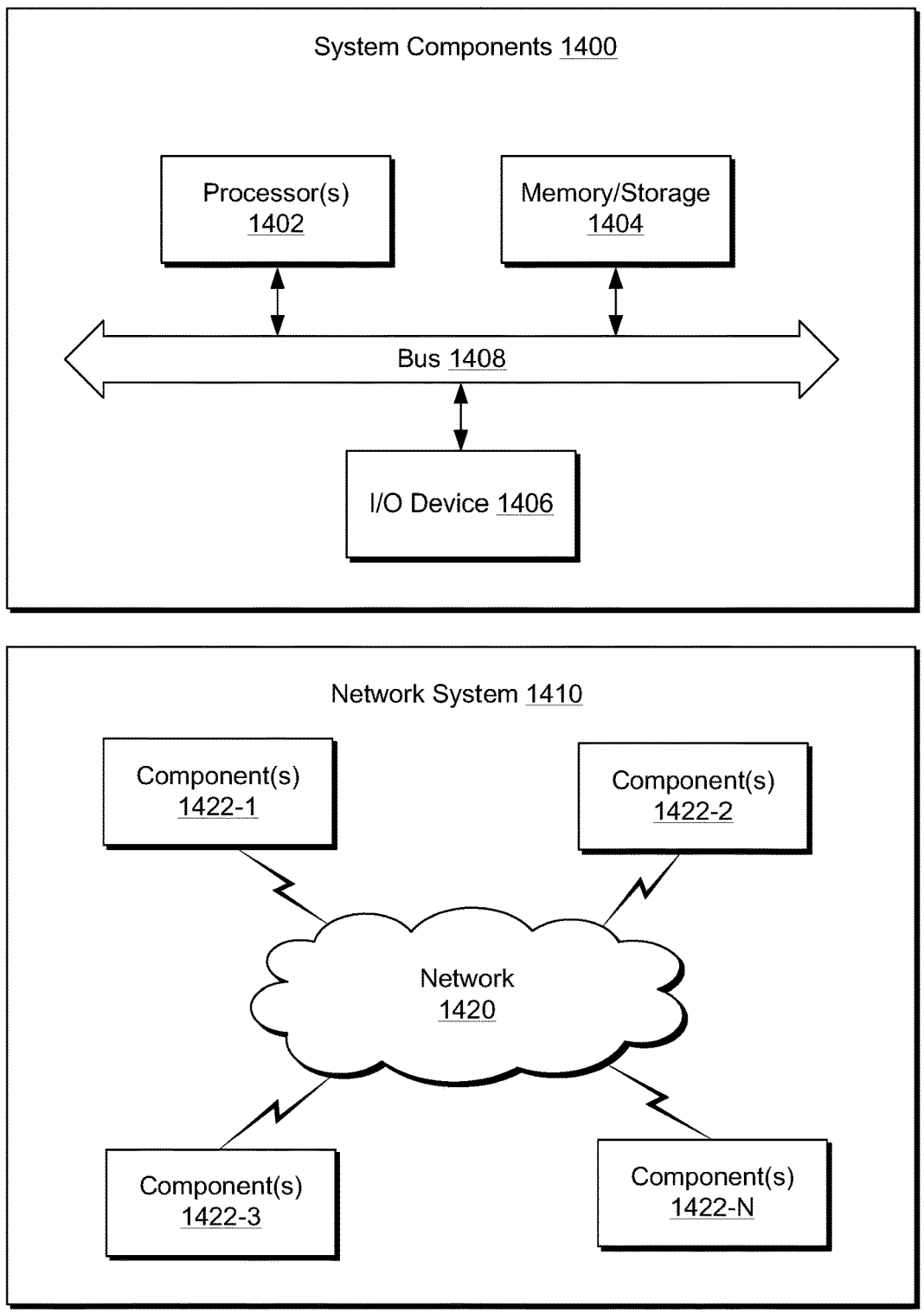
FIG. 14 illustrates components of a system and a networked system.

FIG. 14 shows components of a computing system 1400 and a networked system 1410 and a network 1420. The system 1400 includes one or more processors 1402, memory and/or storage components 1404, one or more input and/or output devices 1406 and a bus 1408. Instructions may be stored in one or more computer-readable media (memory/storage components 1404). Such instructions may be read by one or more processors (see the processor(s) 1402) via a communication bus (see the bus 1408), which may be wired or wireless. The one or more processors may execute such instructions to implement (wholly or in part) one or more attributes (as part of a method). A user may view output from and interact with a process via an I/O device (see the device 1406). A computer-readable medium may be a storage component such as a physical memory storage device such as a chip, a chip on a package, a memory card, etc. (a computer-readable storage medium).

Components may be distributed, such as in the network system 1410. The network system 1410 includes components 1422-1, 1422-2, 1422-3, . . . 1422-N. The components 1422-1 may include the processor(s) 1402 while the component(s) 1422-3 may include memory accessible by the processor(s) 1402. Further, the component(s) 1422-2 may include an I/O device for display and optionally interaction with a method. The network may be or include the Internet, an intranet, a cellular network, a satellite network, etc.

A device may be a mobile device that includes one or more network interfaces for communication of information. A mobile device may include a wireless network interface (operable via IEEE 802.11, ETSI GSM, BLUETOOTH®, satellite, etc.). A mobile device may include components such as a main processor, memory, a display, display graphics circuitry (optionally including touch and gesture circuitry), a SIM slot, audio/video circuitry, motion processing circuitry (accelerometer, gyroscope), wireless LAN circuitry, smart card circuitry, transmitter circuitry, GPS circuitry, and a battery. A mobile device may be configured as a cell phone, a tablet, etc. A method may be implemented (wholly or in part) using a mobile device. A system may include one or more mobile devices.

A system may be a distributed environment such as a so-called "cloud" environment where various devices, components, etc. interact for purposes of data storage, communications, computing, etc. A device or a system may include one or more components for communication of information via one or more of the Internet (where communication occurs via one or more Internet protocols), a cellular network, a satellite network, etc. A method may be implemented in a distributed environment (wholly or in part as a cloud-based service).

Information may be input from a display (consider a touchscreen), output to a display or both. Information may be output to a projector, a laser device, a printer, etc. such that the information may be viewed. Information may be output stereographically or holographically. As to a printer, consider a 2D or a 3D printer. A 3D printer may include one or more substances that can be output to construct a 3D object. Data may be provided to a 3D printer to construct a 3D representation of a subterranean formation. Layers may be constructed in 3D (horizons, etc.), geobodies constructed in 3D, etc. Holes, fractures, etc., may be constructed in 3D (as positive structures, as negative structures, etc.).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A method comprising:
   receiving seismic survey data of a subsurface environment from a seismic survey that comprises a source arrangement of sources that is spatially denser than a receiver arrangement of receivers;
   processing the seismic survey data by performing interpolation across the receivers using the principle of reciprocity to generate processed seismic survey data, wherein the processed seismic survey data includes interpolated seismic survey data;
   deriving priors from non-aliased low-frequency spectrum of the interpolated seismic survey data using the principle of reciprocity;
   distinguishing between aliased and true events in the processed seismic survey data based at least partially on the priors; and
   generating an image of at least a portion of the subsurface environment using the true events in the processed seismic survey data.

2. The method of claim 1, further comprising identifying a hydrocarbon in the subsurface environment.

3. The method of claim 1, wherein the seismic survey comprises a marine seismic survey.

4. The method of claim 1, wherein the receivers comprise nodes.

5. The method of claim 4, wherein the nodes comprise ocean bottom nodes.

6. The method of claim 1, wherein the processing comprises performing at least one adjustment based on receiver depth, source depth, or receiver depth and source depth.

7. The method of claim 1, wherein the priors are derived from a portion of the interpolated seismic survey data that is associated with a common receiver gather, and the method further comprises:
   interpolating a common shot gather of the seismic survey data using the priors derived from the portion of the interpolated seismic survey data associated with the common receiver gather.

8. The method of claim 7, wherein the processing comprises utilizing matching pursuit Fourier interpolation (MPFI).

9. The method of claim 1, wherein the processing reduces aliasing artifacts.

10. The method of claim 1, wherein the seismic survey data comprise aliasing artifacts and seismic events.

11. The method of claim 10, wherein the seismic events comprise non-aliased seismic events.

12. The method of claim 1, further comprising:
   deriving usable priors from interpolation across the sources; and
   utilizing the usable priors for stabilizing reconstruction across the receivers.

13. The method of claim 1, wherein the priors are derived from a portion of the interpolated seismic survey data that is associated with a non-aliased interpolated frequency spectrum of a common receiver gather, and the method further comprises:
   stabilizing reconstruction of a common shot gather using the priors derived from the portion of the interpolated seismic survey data associated with the common receiver gather.

14. The method of claim 13, further comprising interpolating across the receivers using the derived priors.

15. The method of claim 1, wherein the processing comprises adjusting for a water velocity correction that accounts for changes in sea conditions over time.

16. The method of claim 1, wherein the processing comprises using constant water velocity re-datuming to map the sources and the receivers to a common datum level.

17. The method of claim 1, wherein the priors are determined using the sources to span a wider range of a non-aliased part of a frequency-wavenumber spectrum to improve resolution of priors to de-alias seismic events across receivers.

18. A system comprising:
   a processor;
   memory operatively coupled to the processor; and
   processor-executable instructions stored in the memory to instruct the system to:
      receive seismic survey data of a subsurface environment from a seismic survey that comprises a source arrangement of sources that is spatially denser than a receiver arrangement of receivers;
      process the seismic survey data by performing interpolation across the receivers using the principle of reciprocity to generate processed seismic survey data, wherein the processed seismic survey data includes interpolated seismic survey data;
      derive priors from non-aliased low-frequency spectrum of the interpolated seismic survey data using the principle of reciprocity;
      distinguish between aliased and true events in the processed seismic survey data based at least partially on the priors; and generate an image of at least a portion of the subsurface environment using the true events of the processed seismic survey data.

19. The system of claim 18,
wherein to derive the priors from the non-aliased low-frequency spectrum of the interpolated seismic survey data, the processor-executable instructions stored in the memory instruct the system to derive the priors from a portion of the interpolated seismic survey data that is associated with a common receiver gather; and
wherein the processor-executable instructions stored in the memory further instruct the system to interpolate a common shot gather of the seismic survey data using the priors derived from the portion of the interpolated seismic survey data associated with the common receiver gather.

20. One or more computer-readable storage media comprising computer-executable instructions executable to instruct a computing system to:

receive seismic survey data of a subsurface environment from a seismic survey that comprises a source arrangement of sources that is spatially denser than a receiver arrangement of receivers;
process the seismic survey data by performing interpolation across the receivers using the principle of reciprocity to generate processed seismic survey data, wherein the processed seismic survey data includes interpolated seismic survey data;
derive priors from non-aliased low-frequency spectrum of the interpolated seismic survey data using the principle of reciprocity;
distinguish between aliased and true events in the processed seismic survey data based at least partially on the priors; and
generate an image of at least a portion of the subsurface environment using the true events of the processed seismic survey data.

\* \* \* \* \*